United States Patent
Volkov et al.

(10) Patent No.: US 11,023,318 B1
(45) Date of Patent: Jun. 1, 2021

(54) SYSTEM AND METHOD FOR FAST RANDOM ACCESS ERASURE ENCODED STORAGE

(71) Applicant: Virtuozzo International GmbH, Schaffhausen (CH)

(72) Inventors: Oleg Volkov, Moscow (RU); Andrey Zaitsev, Moscow (RU); Alexey Kuznetzov, Moscow (RU); Pavel Emelyanov, Moscow (RU); Alexey Kobets, Seattle, WA (US); Kirill Korotaev, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 209 days.

(21) Appl. No.: 16/014,595

(22) Filed: Jun. 21, 2018

Related U.S. Application Data

(60) Provisional application No. 62/524,001, filed on Jun. 23, 2017.

(51) Int. Cl.
| | |
|---|---|
| *G06F 16/22* | (2019.01) |
| *G06F 16/17* | (2019.01) |
| *G06F 16/18* | (2019.01) |
| *G06F 11/10* | (2006.01) |
| *G06F 16/174* | (2019.01) |

(52) U.S. Cl.
CPC ...... *G06F 11/1076* (2013.01); *G06F 11/1004* (2013.01); *G06F 16/1752* (2019.01); *G06F 16/1805* (2019.01); *G06F 16/2246* (2019.01)

(58) Field of Classification Search
USPC .............. 711/114, 103, E12.022, E12.059, 711/E12.103, 154
See application file for complete search history.

(56) References Cited

U.S. PATENT DOCUMENTS

| | | | | |
|---|---|---|---|---|
| 7,055,058 | B2 * | 5/2006 | Lee ..................... | G06F 11/1084 711/114 |
| 7,870,172 | B1 * | 1/2011 | Sarma ..................... | G06F 16/17 707/822 |
| 9,959,062 | B1 * | 5/2018 | Piszczek ............... | G06F 3/0689 |
| 2013/0166816 | A1 * | 6/2013 | Atkisson ............. | G06F 12/0802 711/102 |
| 2017/0329705 | A1 * | 11/2017 | Gupta .................. | G06F 12/0253 |
| 2018/0232308 | A1 * | 8/2018 | Kusters ................... | G06F 3/065 |

* cited by examiner

*Primary Examiner* — Sanjiv Shah
*Assistant Examiner* — Edward Waddy, Jr.
(74) *Attorney, Agent, or Firm* — Arent Fox LLP; Michael Fainberg

(57) ABSTRACT

A system and method is provided for fast random access erasure encoded storage. An exemplary method includes writing data to an append-only data log that includes data log extents that are each associated with data that is mapped to corresponding offset range of a virtual file of a client and storing the append-only data log as a sequence of data chunks each allocated on one or more one storage disks. Moreover, the method determines an amount of useful data in one or more data chunks and, when the amount of useful data in the data chunk is less than a predetermined threshold, appending the useful data from the data chunk to an end of the append-only data log. Finally, the data log is cleaned by releasing the one or more data chunk from the append-only data log after the useful data is appended to the append-only data log.

16 Claims, 19 Drawing Sheets

SYSTEM AND METHOD FOR FAST RANDOM ACCESS ERASURE ENCODED STORAGE

CROSS-REFERENCE TO RELATED APPLICATIONS

The current application claims priority to U.S. Patent Provisional Application No. 62/524,001, filed Jun. 23, 2017, and entitled "Fast Random Access Erasure Encoded Storage", the entire contents of which are hereby incorporated by reference.

TECHNICAL FIELD

The present disclosure generally relates to the field of electronic data storage and backup, and, more specifically, to a system and method for fast random access erasure encoded storage.

BACKGROUND

Distributed data-storage systems are software solutions that operate over hardware infrastructures that can include a large number of servers of various designations that are connected together by multiple communication channels. Currently, conventional systems can be subject to various kinds of hardware failures, including total or partial switching off of the electrical supply, network failures that may result in the storage system being divided into separate unconnected segments, disk failures, and the like.

In view of these concerns, there is always a tradeoff between storage capacity, costs, and data reliability when designing implementations for such digital storage environments. The general challenge is to make data highly available while keeping costs low and performance high. Various Redundant Array of Independent Disks (i.e., "RAID") implementations have been developed to provide users a choice of designs based on their individual storage requirements. However, each design has advantages and disadvantages and one size certainly does not fit all.

For example, RAID 1 writes 2 copies of the data to two separate disks. This design is often referred to as mirroring. The advantages of RAID 1 include high availability (since the data exists on two disks), and good read performance (since applications can read the data from either disk at the same time). In addition, data recovery is also very quick because even if the data is corrupted on one disk, it will most likely be accessible on the other disk without the need for a data repair computation. The disadvantages of RAID 1 are storage capacity and related costs, i.e., two copies of data require twice as much storage capacity and write performance since all data must be written twice to complete a write operation.

Other RAID designs spread data across multiple disks, commonly referred to as striping. In these designs, striped data also includes one or two parity bits written to one or more disks in the storage cluster. These parity bits can be used for error detection and to help determine if data is missing or has been corrupted. The parity bits can also be used to reconstruct corrupted data. For example, RAID levels 5 and 6 are commonly used implementations of striping and parity. RAID 5 and RAID 6 are also forms of erasure coding implemented in hardware. In addition, RAID 1+0 or RAID 10 combines disk mirroring and disk striping to protect data. This approach is suitable for I/O intensive workloads since it provides both redundancy and performance.

Erasure coding is a data protection design in which data is broken into fragments, expanded and encoded with redundant data pieces and stored across different storage nodes or disks. In particular, data can be split into blocks (blocks are not necessarily blocks of a block device, but instead blocks can be data chunks or any parts) and one separate parity block. If one of the blocks is lost, the system can use the parity block to restore the lost block. This scheme works with only one lost block. Thus, to survive the loss of 2 data blocks, another parity block calculated in a different way can be added.

In general, the scheme when there are N blocks plus 2 parity blocks is usually called "RAID6". If there are more parity blocks, the algorithm is referred to as an "(n,k) scheme" or Reed-Solomon. In such implementations, the scheme generates n chunks (i.e., data fragments) of the block of data using encoding techniques in such a way that any k chunks will be sufficient to recover the initial block of data. Each of the n chunks obtained should be written to a separate disk, and, preferably, to a separate server to ensure high availability of the data.

When erasure coding is implemented for storage systems, if data is written in a file that is split into blocks and then a portion of the data in a particular block is changed, the system also needs to change its neighboring blocks. In addition, the operation should be atomic, but with the blocks stored on different servers. Accordingly, making the operations atomic becomes a very complex issue. Thus, a system and method is needed for providing fast data storage using erasure encoding.

SUMMARY

In view of the technical limitations of existing storage techniques described above, a system and method is disclosed herein that provides for fast random access erasure encoded storage. Thus, according to an exemplary aspect, a method for providing fast data storage using erasure encoding is disclosed that includes writing data to an append-only data log that includes a plurality of data log extents each associated with data that is mapped to corresponding offset range of a virtual file of a client; storing the append-only data log as a sequence of data chunks each allocated on at least one storage disk; determining an amount of useful data in at least one of the data chunks of the append-only data log that is currently mapped to an offset range of the virtual file; when the amount of useful data in the at least one data chunk is less than a predetermined threshold, appending the useful data from the at least one data chunk to an end of the append-only data log; and cleaning the append-only data log by releasing the at least one data chunk from the append-only data log after the useful data is appended to the end of the append-only data log.

In another exemplary aspect, the method includes providing a mapping structure that respectively maps a plurality of data extents of the virtual file with the plurality of data log extents of the append-only data log; updating the mapping structure after the useful data is appended to the end of the append-only data log to map the useful data to the corresponding offset range in the virtual file; and maintaining useful data length counters for at least a portion of the data chunks used for storing data extents of the client and updating the useful data length counters on every mapping structure update.

In another exemplary aspect, the mapping structure is a log-structure merge tree that contains a plurality of trees each having an array of key-value pairs, wherein a first tree maps the plurality of extents of the virtual file with the respective plurality of data log extents of the append-only data log, a second tree maintains a reverse mapping, and a third tree maintains the useful data length counters for at least a portion of the data chunks containing useful data that is used by the virtual file.

In another exemplary aspect, the method includes temporarily storing key-value pairs in a journal in electronic memory, wherein the stored key-value pairs map the respective data log extents of the append-only data log to the corresponding data extents of the virtual file; merging content in the journal into a lower-level tree in the log-structure merge tree when the journal is full of key-value pairs; and merging the lower-level tree to a next level tree in the log-structure merge tree when the lower-level tree is full.

In another exemplary aspect, the method includes temporarily storing, in the journal, new useful data mapped to an offset range of the virtual file; and appending the new useful data to the end of the append-only data log before merging the journal content into the lowest-level tree in the log-structure merge tree.

In another exemplary aspect, the method includes dividing the append-only data log into stripes having a configurable maximum size; dividing each stripe into a plurality of K data fragments; creating a plurality of M parity blocks for redundancy of the plurality of K data fragments; and distributing the plurality of K data fragments and the plurality of M parity blocks as strips to the at least one storage disk allocated for the respective data chunk.

In another exemplary aspect, the method includes performing the cleaning of the append-only data log when the at least one storage disk has less free space than a predetermined threshold.

In another exemplary aspect, the method includes temporarily storing the data for a new data stripe in a write buffer; and distributing the new data stripe in the at least one storage disk when the length of the data stored in the write buffer exceeds a predetermined maximum stripe size or upon a flushing data instruction for the write buffer.

In another exemplary aspect, the method includes receiving, from a client, a write request to the virtual file; storing the data from the write request to the write buffer; writing the data stored in the write buffer to the append-only data log when a length of the data stored in the write buffer exceeds a predetermined maximum stripe size or upon a flushing data instruction for the write buffer; writing corresponding updates to a mapping between data log extents and virtual file offset ranges to a journal; and merging the journal to a log structured merge tree when a length of the journal exceeds a predefined threshold.

In an exemplary aspect, a system is disclosed for providing fast data storage using erasure encoding. In this aspect, the system includes at least one storage disk; and at least one processor configured to write data to an append-only data log that includes a plurality of data log extents each associated with data that is mapped to corresponding offset range of a virtual file of a client; store the append-only data log as a sequence of data chunks each allocated on the at least one storage disk; determine an amount of useful data in at least one of the data chunks of the append-only data log that is currently mapped to an offset range of the virtual file; when the amount of useful data in the at least one data chunk is less than a predetermined threshold, append the useful data from the at least one data chunk to an end of the append-only data log; and clean the append-only data log by releasing the at least one data chunk from the append-only data log after the useful data is appended to the end of the append-only data log.

In another exemplary aspect of the system, a mapping structure is provided that respectively maps a plurality of data extents of the virtual file with the plurality of data log extents of the append-only data log. In this aspect, the at least one processor is further configured to update the mapping structure after the useful data is appended to the end of the append-only data log to map the useful data to the corresponding offset range in the virtual file; and maintain useful data length counters for at least a portion of the data chunks used for storing data extents of the client and updating the useful data length counters on every mapping structure update.

In another exemplary aspect of the system, the mapping structure is a log-structure merge tree that contains a plurality of trees each having an array of key-value pairs, wherein a first tree maps the plurality of extents of the virtual file with the respective plurality of data log extents of the append-only data log, a second tree maintains a reverse mapping, and a third tree maintains the useful data length counters for at least a portion of the data chunks containing useful data that is used by the virtual file.

In another exemplary aspect of the system, the at least one processor is further configured to temporarily store key-value pairs in a journal in electronic memory, wherein the stored key-value pairs map the respective data log extents of the append-only data log to the corresponding data extents of the virtual file; merge content in the journal into a lower-level tree in the log-structure merge tree when the journal is full of key-value pairs; and merge the lower-level tree to a next level tree in the log-structure merge tree when the lower-level tree is full.

In another exemplary aspect of the system, the at least one processor is further configured to temporarily store, in the journal, new useful data mapped to an offset range of the virtual file; and append the new useful data to the end of the append-only data log before merging the journal content into the lowest-level tree in the log-structure merge tree.

In another exemplary aspect of the system, the at least one processor is further configured to divide the append-only data log into stripes having a configurable maximum size; divide each stripe into a plurality of K data fragments; create a plurality of M parity blocks for redundancy of the plurality of K data fragments; and distribute the plurality of K data fragments and the plurality of M parity blocks as strips to the at least one storage disk allocated for the respective data chunk.

In another exemplary aspect of the system, the at least one processor is further configured perform the cleaning of the append-only data log when the at least one storage disk has less free space than a predetermined threshold.

In another exemplary aspect of the system, the at least one processor is further configured to temporarily store the data for a new data stripe in a write buffer; and distribute the new data stripe in the at least one storage disk when the length of the data stored in the write buffer exceeds a predetermined maximum stripe size or upon a flushing data instruction for the write buffer.

In another exemplary aspect of the system, the at least one processor is further configured to receive, from a client, a write request to the virtual file; store the data from the write request to the write buffer; write the data stored in the write buffer to the append-only data log when a length of the data stored in the write buffer exceeds a predetermined maximum stripe size or upon a flushing data instruction for the write buffer; write corresponding updates to a mapping between data log extents and virtual file offset ranges to a journal; and merge the journal to a log structured merge tree when a length of the journal exceeds a predefined threshold.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
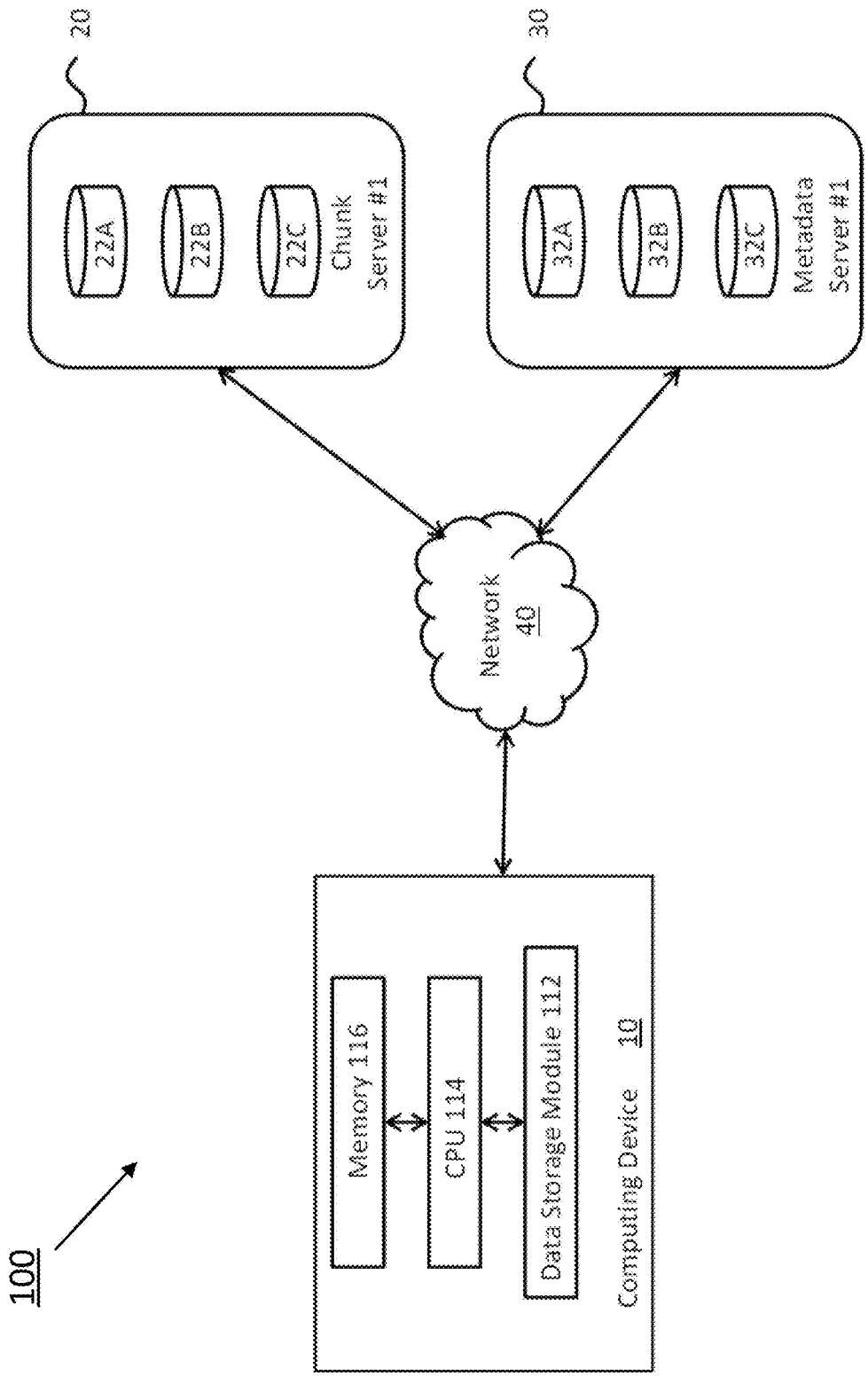
FIG. 1 is a high-level block diagram illustrating a system for fast random access erasure encoded storage according to an exemplary aspect.

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

FIG. 1 is a high-level block diagram illustrating a system for fast random access erasure encoded storage according to an exemplary aspect. As shown, the system 100 can include a client device 10, and two types of servers: chunk servers (e.g., chunk server 20) and metadata data servers (e.g., metadata server 30). It should be appreciated that while only a single chunk server 20 and a single metadata server 30 are shown, the system 100 generally can include either a single, or in most cases, multiple servers of each type.

As further shown, each of the chunk servers and metadata servers can include one or a plurality of disks for data storage. For example, chunk server 20 can include physical disks 22A, 22B and 22C and metadata server 30 can include physical disks 32A, 32B and 32C. Again it is reiterated that the two servers and three disks per server is shown according to illustrated aspect, but that the exemplary aspect is in no way intended to be limited to this number of servers and/or disks. In addition, it is contemplated that each of the servers 20 and 30 can include specific hardware and software components (not shown) configured to manage various storage resources within the computing environment. For example, each of the disks can be a typical data storage device (e.g., hard disk drives, optical drives, and/or the like).

Furthermore, according to an exemplary aspect, the chunk servers (e.g., chunk server 20) and the metadata servers (e.g., metadata server 30) can be provided as part of an online/remote storage service (e.g., a cloud computing service, or cloud storage, or a remote file storage), but alternatively can be incorporated into a local area network or the like (or even can be located on a client node in some aspects) as should be appreciated to those skilled in the art. Thus, according to some exemplary aspects, each of servers 20 and 30 are configured to communicate remotely with computer 10 via network 40 using data communication protocols as known to those skilled in the art, for example. Network 40 can be any network for communicating data and data operations and can include a communication system (not shown) that connects the various computers of the system by wire, cable, fiber optic, and/or wireless links facilitated by various types of well-known network elements, such as hubs, switches, routers, and the like. Network 40 may employ various well-known protocols to communicate information amongst the network resources. In one aspect, network 40 can be part of the Internet or intranet using various communications infrastructure such as Ethernet, WiFi and the like.

The client device 10 is capable of communicating with the chunk servers and metadata servers via network 40. According to the exemplary aspect, the computer 10 may be any type of computing device, for example, a separate server, a laptop, a desktop, and/or the like. In the exemplary aspect, the computer 10 includes data storage module 12, computer-processing unit ("CPU") 14 and memory 16. According to one aspect, the data storage module 12 includes software code (e.g., processor executable instructions) in memory, that executes/facilitates the algorithms described herein for fast random access erasure encoded storage. Thus, as shown, the computer 10 includes CPU 14 for executing the data storage module 12 and memory 16.

Referring back to FIG. 1, a data storage module 12 is configured to provide to client access to the data stored in the system across one or more of the disks (e.g., on disks in chunk servers—CS). For example, in one aspect, the data storage module 12 can be a daemon running on the client device 10 that provides to client (e.g., to a user or an application on the client device 10) random access to the data via a virtual file (e.g., virtual file 103 on FIG. 3 described below), with which the client can perform usual file operations, such as read and/or write requests, for example. It is noted that when the disclosure refers to the data storage module 12 herein, this module can be implemented as a single software daemon, a plurality of software modules, or the like as should be appreciated to one skilled in the art. Moreover, it should also be appreciated that the exemplary embodiments describe writing of any data to a virtual file 103, and in some cases, the data can be written, for example, by a virtual machine (e.g., a client can be a VM). For example, the data that is written by the client to the storage can be any data used by the virtual machine or even a virtual machine disk, for example.

In any event, according to the exemplary aspect, when the user reads from the virtual file (e.g., as a read request), the daemon using information from a mapping structure (e.g., mapping structure 105 also described below) looks for the required data in a data stream 102 (also called data log or append-only data log) that corresponds to the virtual file. Moreover, in certain aspects, the daemon accesses the cloud storage to access the requested data from the physical disks (e.g., disks 22A, 22B and 22C) on chunk servers (e.g., chunk server 20). When the user writes to the virtual file (i.e., as a write request), the daemon will add this new data (further the term "extent" will be used to denote offset ranges (e.g., in the virtual file or in the data stream) associated with the data) to the end of data stream, update the mapping structure (which maps the respective offset ranges), and, in some aspects, interface with the cloud storage to distribute this data to the disks on the chunk servers. In addition, according to one aspect, using a garbage collection technique that will be described in detail below, the daemon is configured to delete the data chunks in the data stream that contain a high percentage of the data that is not used by the client device any longer (e.g., this data was rewritten by the client in virtual file) due to a write request, for example. The details of these processes will be described below.

It should be appreciated that the computer data of the data file may be any type of electronic, digital data generated and/or stored by a computer. For example, the computer data can represent text data, executable program code, or any other type of digital data. In this aspect, the metadata servers (e.g., metadata server 30) are configured to store file metadata that includes where and in which format the data is stored. Moreover, in some aspects, as will be explained in detail below, the data storage module 12 of computing device 10 is configured to separate the data into chunks that are stored on the chunk servers (e.g., chunk server 20) and, in particular, the storage disks, such as disks 22A, 22B and/or 22C, for example. In other words, these storage nodes run services that store all the data in the form of fixed-size chunks and provide access to these data chunks.

According to an exemplary aspect, the chunk servers do not store metadata except for checksums. Thus, to access the data, the client device 10 is configured to further access metadata server 30, which sends information to the client device 10 and to the chunk server 20 indicating the real data location, where this location information can be sent as a structure called a "map". It is noted that this "map" should not be confused with mapping structure 105, which describes location of parts of data in the data stream, not chunks. Moreover, in this aspect, the sent map can have a version. Thus, only when the version of the map sent to the client device 10 and to the chunk server 20 coincide, the chunk server 20 can provide access to the client device 10 to access the requested data. In addition, for a new client, the metadata server 30 will reissue the map with a new version and, by doing, guarantee that only one client has access to the chunk server 30 at a time since the versions of the maps must coincide.

As described above, the data storage system described herein is generally configured to store data using erasure coding. In this design, the data storage module 12 is configured to divide an incoming data stream into fragments of certain size, then divide/split each fragment into a certain number (M) of (e.g., 1-megabyte) pieces, for example, and creates a certain number (N) of parity pieces for redundancy. The data pieces and parity pieces can be distributed among M+N storage nodes (or at least disks 22A, 22B and 22C of chunk server 20), with one piece per node. On storage nodes, pieces are stored in regular chunks (e.g., of 256 MB), for example, but such chunks are not replicated as redundancy is already achieved. As a result, the storage cluster can survive failure of any N storage nodes without data loss. Moreover, to implement the erasure coding, the system can create and store checksums for the set of N fragments of the chunk (i.e., "strips"), where the number of check sums is called redundancy.

Moreover, typically the format of the file (e.g., the virtual file 103) with erasure coding (i.e., the number of strips and checksums) cannot be changed after the file creation. However, in one aspect, if the encoding format of the file needs to be changed, a new file can be created with the same data, but having another encoding format. When the new file with new encoding format is created (in some aspects this file is empty at this step, in others it does not), then the content of the old data stream (with old encoding), such as data stream 102, will be copied to the new created one, the chunks of the old file will be deleted, and old information (e.g., the metadata) will be deleted from the mapping table 105.

Figure 2A:
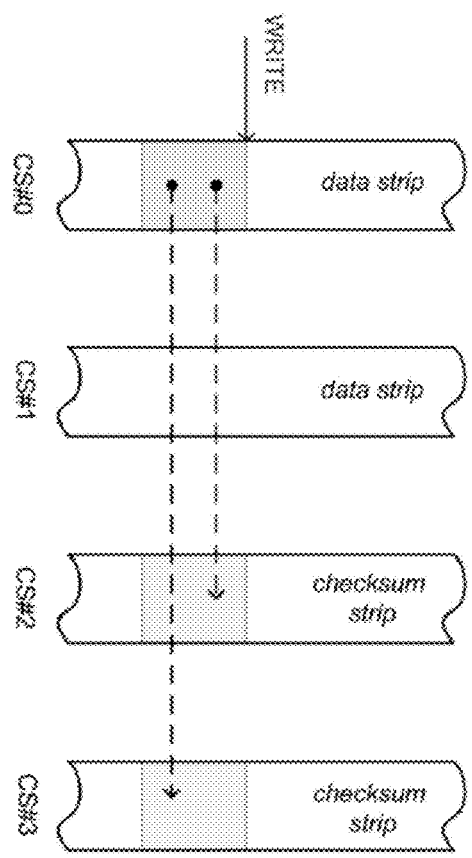
FIG. 2A is a flow diagram of a plurality of chunk servers illustrating the problem of how overwriting of data in RAID6 or a Read-Solomon encoded stripe affects more than a single data location.

In general, it is well known that overwriting data in RAID6 or a Read-Solomon encoded stripe affects more than a single data location. For example, FIG. 2A is a flow diagram of a plurality of chunk servers illustrating this problem. As shown, a write request to data in a data strip of chunk server #0 will affect a plurality of checksum strips on chunk servers #1 and #2, for example. As a result, it is hard to manage distributed storage efficiently and consistently as should be understood to one skilled in the art. To overcome this problem, the disclosed exemplary system and method is able to efficiently update distributed data storage by never overwriting to existing data.

Figure 2B:
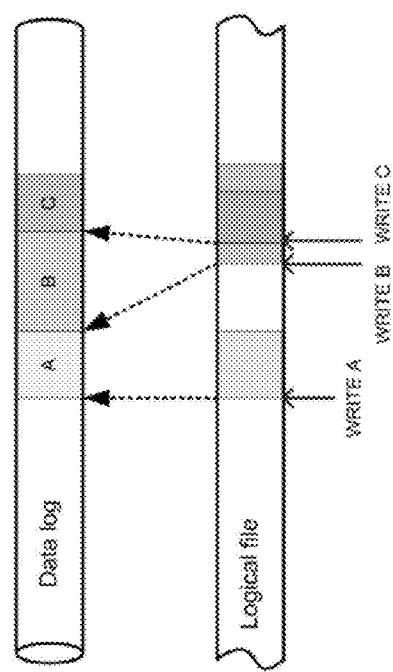
FIG. 2B illustrates a conceptual diagram of the exemplary system and method.

FIG. 2B illustrates a conceptual diagram of an exemplary system and method. As shown, a logical or "virtual file" (also considered an "append-only virtual file") is provided in which a plurality of write requests can be received from a client (e.g., a client of the client device, an application or other program on the client device, remote user, virtual machine, container, etc.) and executed thereon, for example. Moreover, the data in the logical file (i.e., the append-only virtual file) will be mapped to a data stream 102 (which is also shown as a "append-only data log" on FIG. 2), which is a different entity. It is noted that the terms data stream and data log are used interchangeably herein.

Moreover, the client device working with the data sees the data that is stored from its point of view by the offset x in logical file (i.e., virtual file), and it actually lies in the data log from the y offset. As a result, the system and method generates metadata that maps offset x to offset y for each piece of data written by the client. These data fragments on in the data log (e.g., data A, B, and C) are called "extents". As will be described in detail below, as additional data is written to the logical file, it will always be appended to the end of the "append-only" data log. Moreover, in one aspect, the exemplary system and method performs a garbage collection, which will be described in detail below, during which data that is no longer used in the data stream (e.g., data that is already rewritten by the user of the logical file and is no longer considered "useful data") can be removed to free up space. Thus, as will be described below, the data (e.g., writes A, B and C) will be mapped to the physical offset and updated continuously according to the exemplary aspect.

In any event, referring again to the exemplary aspect of FIGS. 1 and 2A, when implementing redundancy encoding in general, if one or more bytes in the middle of a block need to be changed, the system needs to code the block again. To avoid recoding, data can be written in immutable blocks, which, means that all data will always be inserted at the end of the data stream. Therefore, with this implementation, it should be appreciated that the data in the data stream should never change, but instead data should be written at the end of the data stream (i.e., the end of the append-only data log). Accordingly, the system and method disclosed herein implements random access to a virtual file by storing updates onto the append-only data stream 102. Thus, as will be described in more detail below with respect to FIG. 4, the new data is appended to the stream head (i.e., the "end of data" 204b) while the data stream can be trimmed at its tail (i.e., the "start of data" 204a) or a garbage collection can be used so its physical size remains finite, while its logical length always grows according to an exemplary aspect.

Figure 3:
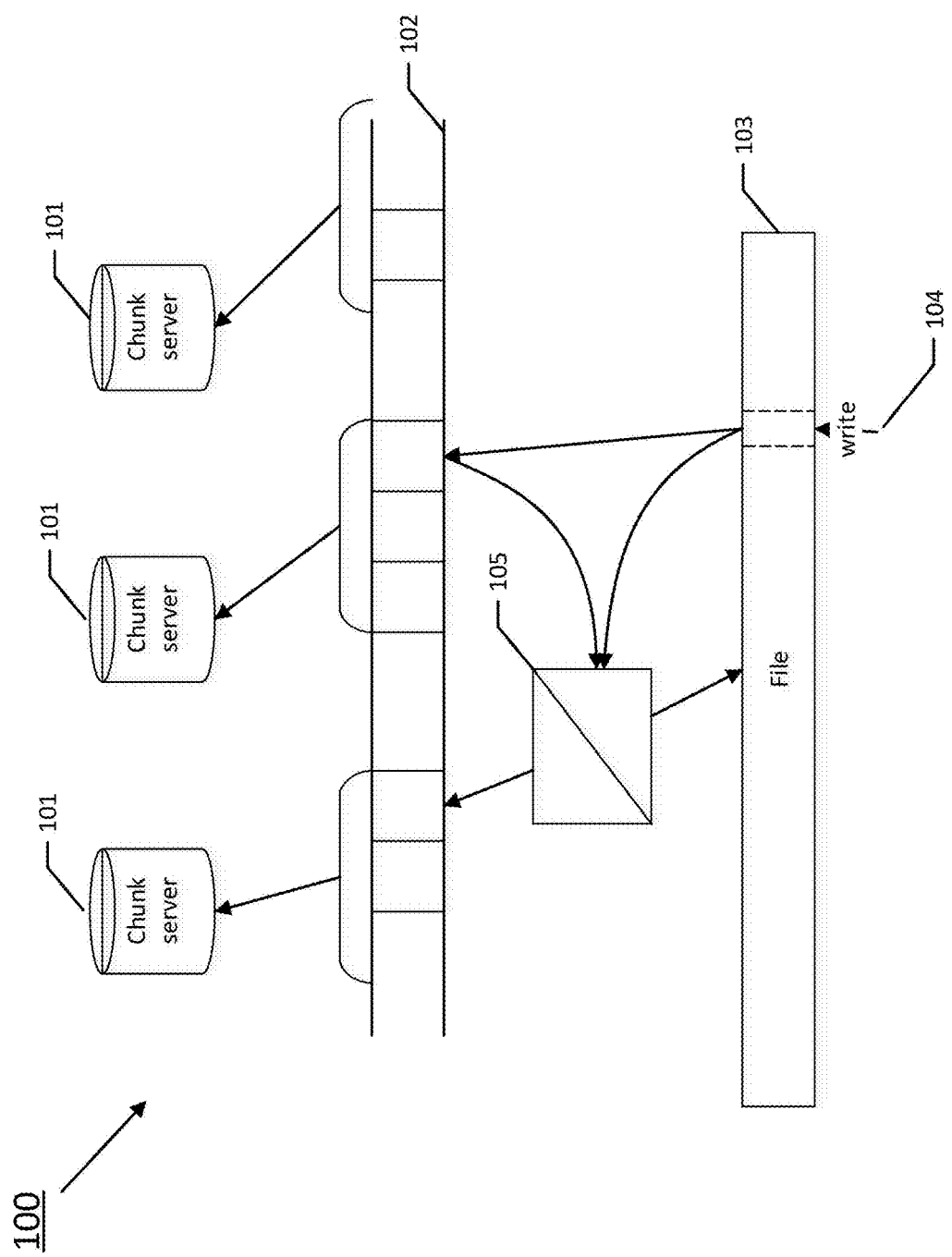
FIG. 3 is a block diagram illustrating the system for fast random access erasure encoded storage according to an exemplary aspect.

FIG. 3 is a block diagram illustrating the system for fast random access erasure encoded storage according to an exemplary aspect. In particular, the system 100, as shown, illustrates the handling by data storage module 12 user requests for creation and/or read and write operations to a virtual file; and storing encoded data to a plurality of storage nodes, such as chunk servers 101, for example. It should be appreciated that the chunk servers 101 can correspond to one or more chunk servers 20 as described above with respect to FIG. 1.

Figure 6:
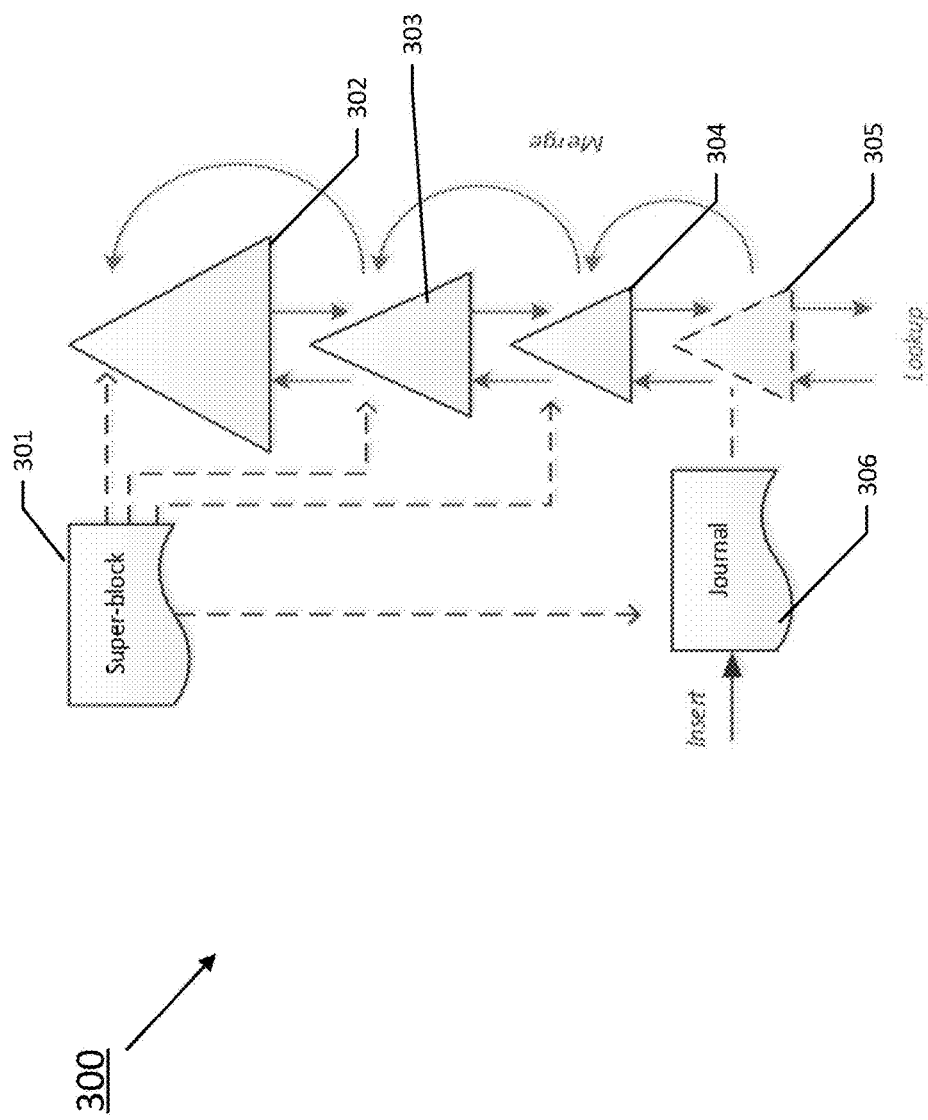
FIG. 6 illustrates an example of an LSM tree implemented for the mapping structure according to an exemplary aspect.

As shown in FIG. 3, the data storage module 12 works with a data file 103 to which the user of the client device 10 (i.e., a user, remote user, client device and/or any program that works with storage) wants to write some data (or read, perform any I/O operation, etc.). It should be appreciated that to the user (or an application), this file 103 appears as a typical computer file in that the user can write to (or read from) any place in the file 103. For purposes of this disclosure, the file 103 can be considered a "logical file" or a "virtual file" because it has a complex underlying structure that is transparent (unseen, unnoticed) to the user and be thought of as a representation of data to user. In one exemplary aspect, the virtual file 103 can be, for example, represented by a directory, for example, an LS-container with a set of files with data (i.e., "real" files representing a data stream as described below) and files with metadata (representing a mapping structure 105, as also described below), which perform mutual mapping between offsets in virtual file and real data in the "real" files. Moreover, in this aspect, the LS-container has a super-block file 301 that stores a list of files in container, a journal and a set of files containing B-trees of different LSM tiers. An exemplary aspect of this implementation is shown in FIG. 6 and described below. Thus, according to the exemplary aspect, the virtual or logical file can be implemented as folder storing data while the trees and super-block can be implemented as separate files.

According to the exemplary aspect, the data storage module 12 is configured to create and/or manage the data stream 102 that contains the data. For purposes of this disclosure, the data in the data stream 102 can be considered a "data log" or "data blob" and can be located on the client device 10, or alternatively in the cloud storage service. In addition, a mapping structure 105 is metadata that is also provided and contains mappings between the pieces of data (i.e., the offset of the data) written to the virtual file 103 and the corresponding offsets in data stream 102. According to an exemplary aspect, the mapping structure can be, for example, a table, log, a set of B-trees (i.e., a self-balancing tree data structure), or any other structure convenient to store mapping as would be appreciated to one skilled in the art. Moreover, in the exemplary aspect the mapping structure 105 can be stored on the client device 10. Although in an alternative aspect, the mapping structure 105 can be stored on metadata server 30, for example, the metadata server 30 is typically not suitable for storing all metadata for these offsets, as there will likely be too much metadata from all client devices using the exemplary system. Therefore, in the exemplary aspect, the storing of the metadata for the mapping structures 105 is offloaded to the client, i.e., the file 103 a user writes to is a directory storing data files (i.e., "real" files) and metadata files organized in a special way as described below. In some aspects, "real" files can be stored on the storage nodes as replicated chunks and storage module 112 is responsible for providing this data to client.

In the exemplary aspect, all data in the data stream 102 can be stored on physical disks that can be any physical disk configured to store data from the data stream 102 as discussed above. moreover, in some aspects as also described above, data in the data stream 102 can be split to fixed-size chunks that can be stored on the chunk servers 101, which are physical disks (or at least virtual environments). Moreover, in a refinement of this aspect, these data chunks can be erasure encoded, in which case a mapping is also provided between data stream 102 and chunk servers 101.

Accordingly, when a user of client device 10, for example, writes a piece of data (e.g., write 104) to the virtual file 103, the data storage module 12 is configured to add the written data as an extent to the end of the data stream 102 and update the mapping structure 105 to reflect this change. In other words, the mapping structure 105 is provided to map the "physical" addresses in the data stream 102 into "logical" addresses in the virtual file 103 that is shown to a user. Thus, when the user writes data 104 to the virtual file 103, the corresponding piece of data is added as an extent at the end of the data stream 102, and the mapping structure 105 that maps this data in the data stream 102 to the data in the virtual file 103 is updated to reflect this new write. Moreover, after the updates, the data storage module 12 can further store (send) the data in data stream 102 to one or more storage disk, such as chunk servers 101 (for example, using a caching function as described below).

According to an exemplary aspect, the data stream 102 is shown as an "infinite" data stream 203. In a refinement of this aspect, the infinite data stream (which can also be considered an append-only virtual disk) can be a virtual block device. Moreover, in some aspects, the virtual file 103 (to which the user writes) is mapped to the append-only virtual disk (i.e., infinite data stream 102) that is mapped to a physical storage disk 202 (e.g., a block device or a set of block devices). In one aspect, the append-only virtual disk can be implemented above any block device or even several block devices, for example, the data from the append-only virtual disk can be split for several data chunks. Further, the chunks can be replicated to achieve erasure encoding as described herein.

In addition, according to another exemplary aspect, there can be an append-only file (representing the data stream 102 (203)), not a disk, or a set of files containing data (in such case they will be denoted as "real" files as opposed to "virtual" file 103). These "real" files will be stored on physical block devices. Moreover, in some aspects, the append-only file can be a set of files laying on disk (or several disks). For example, the append-only file can be comprised of several files laying on chunk servers 101, for example. Moreover, as described above, in some aspects, data on the append-only virtual disk (or in the append-only file) can be split into chunks (e.g., different chunks can be stored on different physical disks).

According to one exemplary aspect, the data storage module 112 is configured to cycle and clean the data stream 102 (203) (e.g., by garbage collection as described herein). Moreover, this data from the data stream 102 (203) can then be stored on at least one physical block device (i.e., physical disks), which can be considered the underlying physical disk.

Figure 4:
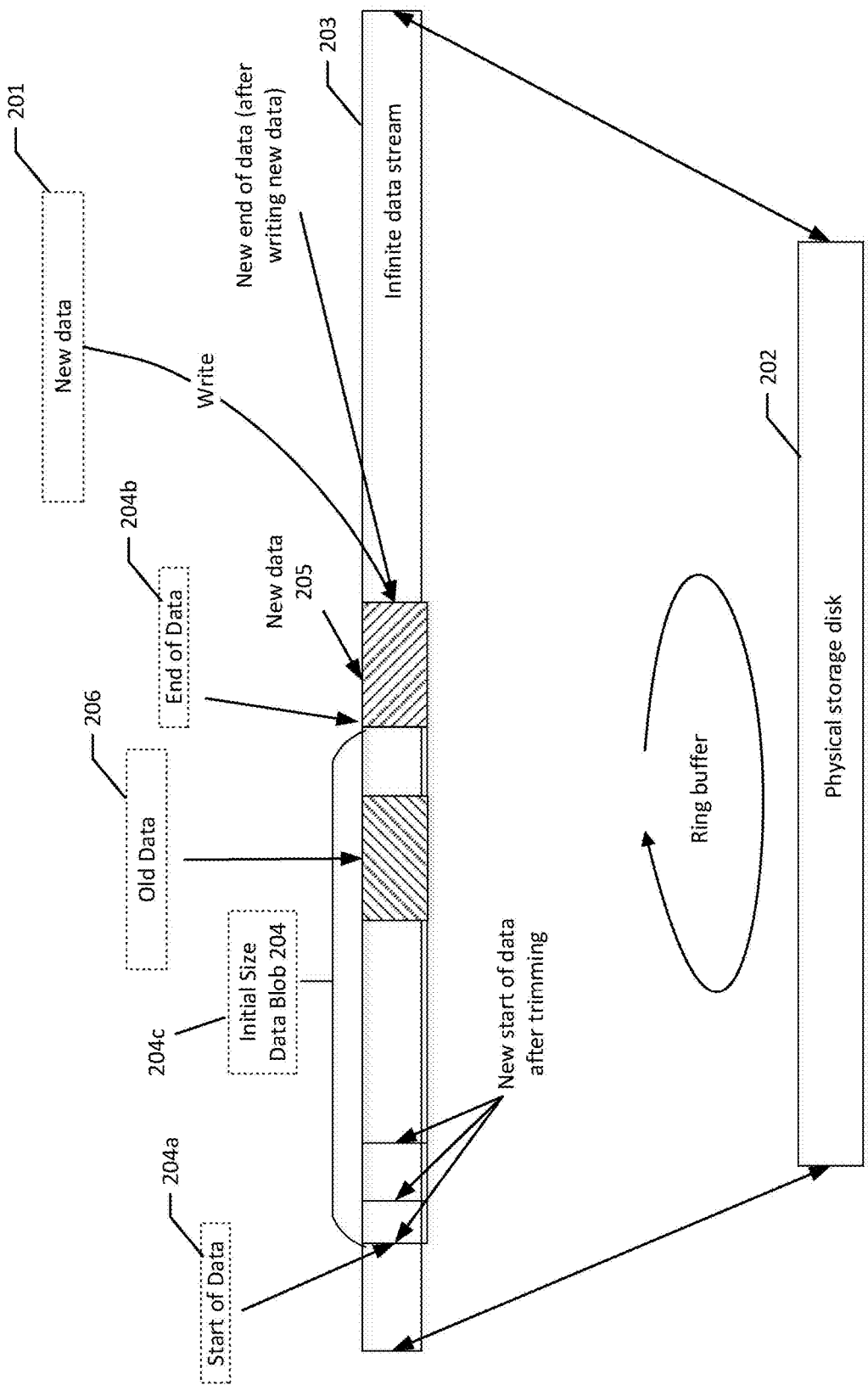
FIG. 4 illustrates a flow diagram illustrating how the data storage module operates the data stream according to an exemplary aspect.

FIG. 4 illustrates a flow diagram of how the data storage module 12 manages the data stream 102 according to an exemplary aspect. In this aspect, the data stream 102 (203) can be represented by an append-only virtual disk, for example. It should be appreciated that exemplary aspects where the data stream 102 (203) is represented by the append-only file may be configured similarly.

As shown in FIG. 4, there is at least one physical storage disk 202 with a finite size (i.e., "disk_size"). The physical disk 202 can correspond to a physical disk(s) on one or more chunk servers described above. As further described above, the infinite data stream 203 (represented by append-only virtual disk or append-only file) is mapped to the physical disk 202. According to the exemplary aspect, once the data is written to the data stream 203, it is never changed. Thus, the example shown includes a data blob 204 (existing at a particular point in time) on the infinite data stream 203 that includes a start of the data 204a, and end of the data 204b, and an initial data size 204c.

As further described above, the data storage module 12 writes all data changes (e.g., new data 201) to the end of the data blob 204 on infinite data stream 203 (i.e., the data stream). In other words, the data storage module 12 writes the new data 201 as a new data block 205 to the end 204b of the data blob 204. However, as the infinite data stream 203 (e.g., if it is represented by append only virtual disk) is mapped to the finite physical disk 202 (i.e., when data from the data stream is stored on the physical disks), the size of the data in the data blob 204 should be smaller than the size of the physical disk (total size of all disks, if there are several disks) (i.e., data_size<disk_size).

In order to maintain the data blob 204 smaller than the size of the physical disk 202, the data storage module 12 can include a data cleaning module that is configured to remove old or "unused" data from the data stream of the data stream 203. In some aspects, the data cleaning module is provided to reduce (e.g., "trim") the physical size of the data stream by removing stale date.

According to an exemplary aspect, when the data storage module 12 needs to rewrite some data (e.g., "useful data" that is currently mapped to the virtual file) to the infinite data stream 203, the new data is appended to the end of the data blob, but the old data (i.e., data 206) is still on the data stream. In some aspects, such old data 206 can be marked as "old", i.e., no longer being used or not actual data (rubbish or garbage). Moreover, in certain aspects, there can be a special data structure containing metadata, information about added data parts, for example, containing mappings between how the data should look for the user (e.g., the agent that writes it) and the real location of the data in data stream. Therefore, after an attempt of "rewriting", the data stream contains new data 205 at the end of the data blob 204, and the old (i.e. not used) data 206 somewhere in the middle of the data blob. Effectively, the size of actual data is smaller than the size of the data on data stream so the unused data 206 should be deleted.

According to an exemplary aspect, to allow for infinite writing to the end of the data stream, the data storage module 12 can implement the following process. Specifically, the data storage module 12 is configured to gradually (i.e., step by step) move the start of the data in data stream (i.e., start 204a) towards the end of the data 204b, for example, like a tail trim, where the start of the data stream acts as a tail. It is noted that while the example shown in FIG. 4 illustrates that the data storage module 12 initially evaluate a first data chunk (or a data block, or a part of data) at the start of data 204a of the data blob, this is only one exemplary implementation. According to another exemplary aspect, as described below, each data chunk is evaluated when its percentage of actual (i.e., used data) falls below a predetermined threshold, such as 75%, or example. The data chunk/block being evaluated can be any such portion of data within the data stream as should be appreciated to one skilled in the art.

According to the exemplary aspect, the data cleaning module of the data storage module 12 evaluates a current data chunk in the data stream, for example, beginning with the data start 204a. If the current data chunk (e.g., a block of data, or some part of data, for example, chunk) being evaluated does not contain actual data (e.g., the entirety of the data was rewritten), then the data storage module 12 can discard this chunk from the data stream. If the data chunk contains actual data (i.e., it has not been rewritten), then the portion of data, which is still in use, is moved to the end 204b of data in data stream in the data stream 203 (e.g., append only virtual disk or append only file). The data storage module 12 then evaluates the next chunk/block to be evaluated (e.g., the next data chunk whose actual data has fallen below the 75% threshold) and can cycle through the whole data stream 203. According to one exemplary aspect, this process can be performed for several data chunks/blocks from the start of the data in data stream 204 or the entire data in data stream 204. As a result, each data chunk/block is evaluated and is either discarded (i.e., if it has been wholly rewritten) or kept either in the same location (if it has low percentage of unused data, i.e. less than a threshold) or moved to the end of the data stream (i.e., rewritten, if ii still has actual data being used, but the percentage of unused data is higher than threshold). Effectively, the infinite data stream 203 can be cycled like a ring buffer, as would be appreciated to one skilled in the art.

As described above, an exemplary system and method provide a technique for "garbage collection" (for example, performed by data cleaning module) to clear up unused data. In some aspects, as described above, the data log grows in length infinitely according to the exemplary aspect. At the same time, portions of this data may no longer be used by the virtual file. For example, if the client overwrote previously recorded data, then this previously recorded data log is no longer used and should no longer be stored.

Figure 5A:
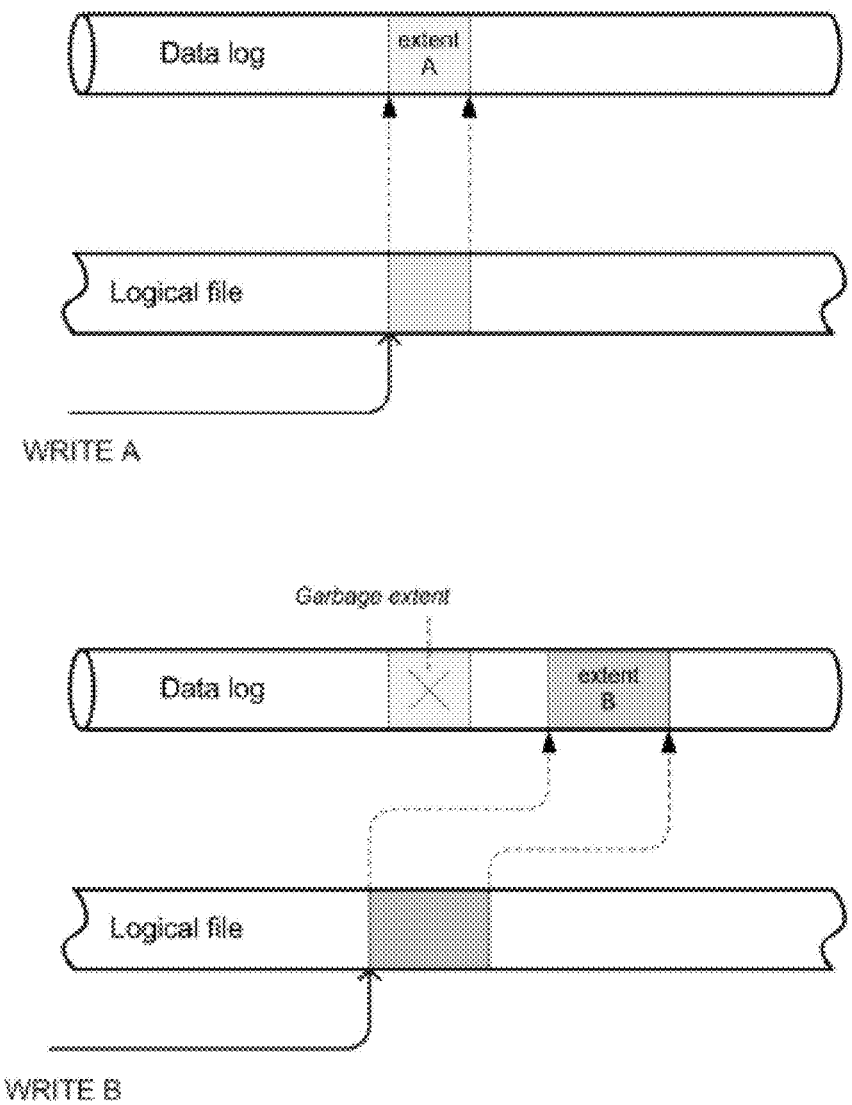
FIG. 5A is a flow diagram illustrating a garbage accumulation problem according to one exemplary aspect.

FIG. 5A is a flow diagram illustrating a garbage accumulation problem according to one aspect. As shown, initially, a write operation (e.g., "write A") is requested to the logical file of which a corresponding "extent A" is added to the data log, as described above. However, when an extent is overwritten in the logical address space (e.g., "write B"), the extent A becomes unused and wastes storage space, i.e., shown has "garbage extent" in the data log. Moreover, the space may be recycled in whole chunks that may never become unused. Thus, as described above, the data cleaning module can be used to address this garbage accumulation problem.

Figure 5B:
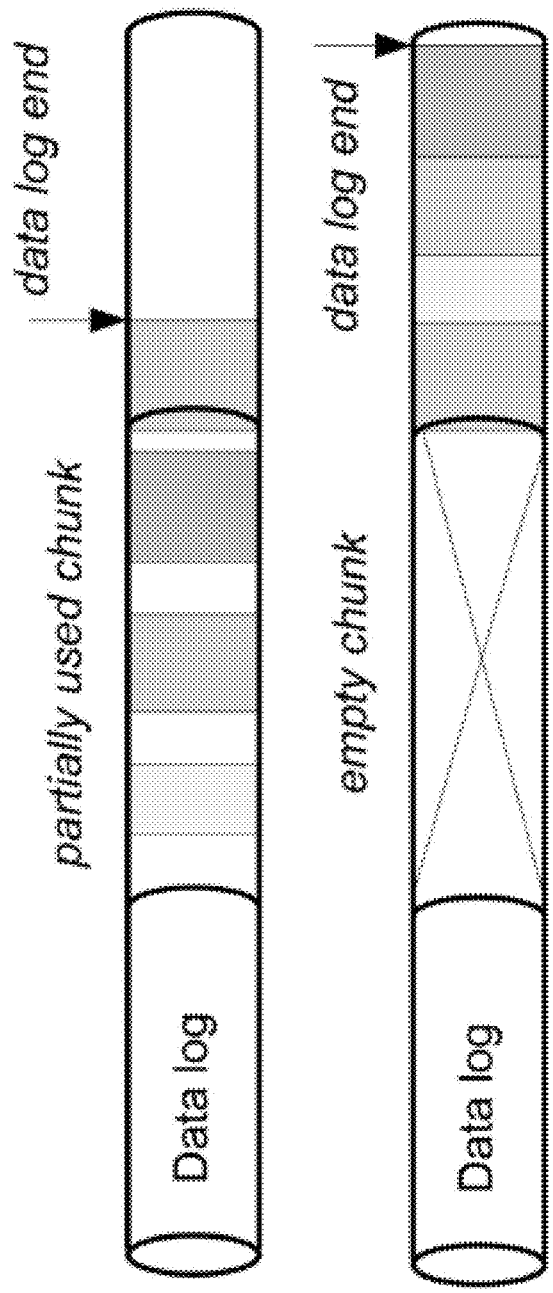
FIG. 5B provides a flow diagram of the garbage collection routing according to an exemplary aspect.

For example, FIG. 5B provides a flow diagram of the garbage collection according to an exemplary aspect. As described above, the data cleaning module of the data storage module 12 is configured to identify chunks with used/total space ratio less than a predefined and configurable threshold (such as 75%, for example). As shown, the extents that are still used by the logical file can be appended to the end of the data stream. Effectively, the relocation of these extents makes the whole chunk unused, such that this whole unused chunk (with all its replicas on Chunk Servers) can be released as further described herein.

Figure 5C:
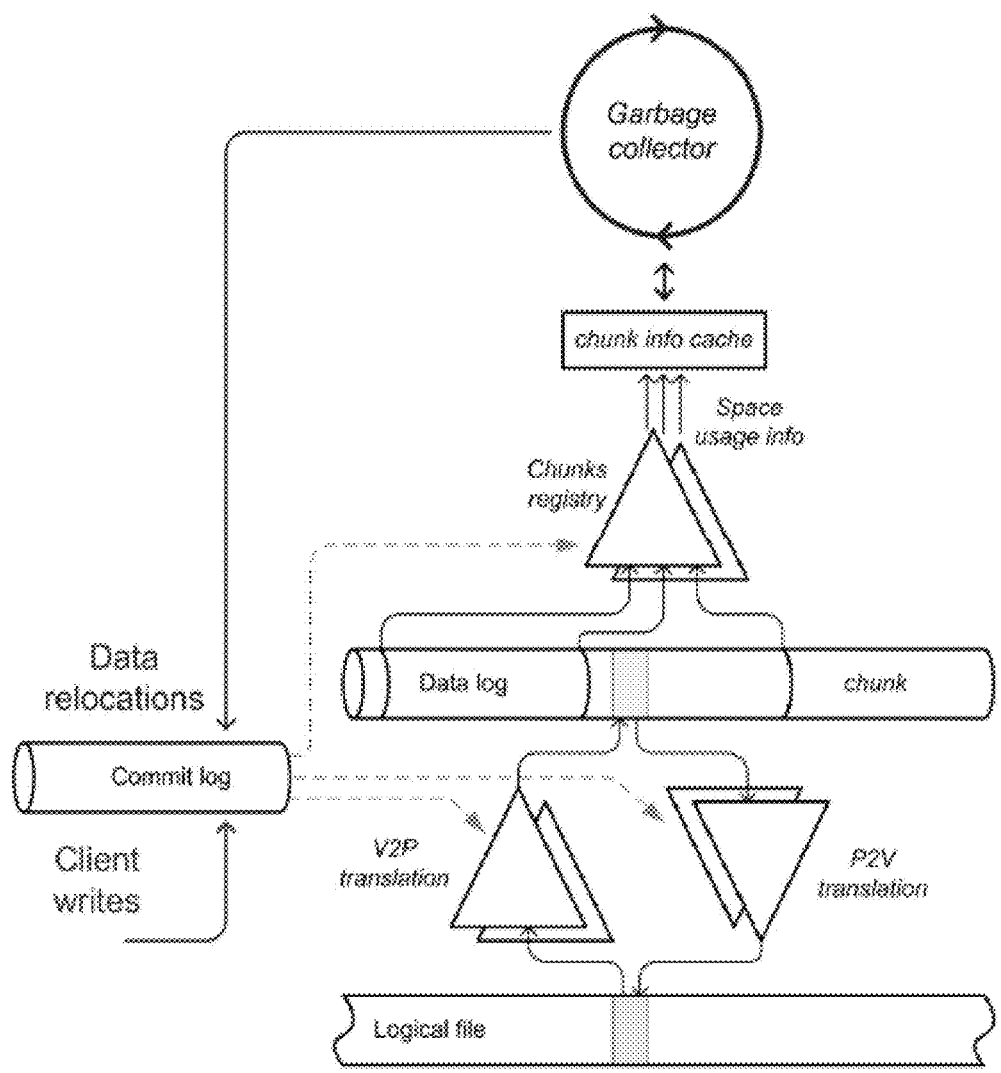
FIG. 5C illustrates a flow diagram for managing the garbage collection metadata according to an exemplary aspect.

FIG. 5C illustrates a flow diagram for managing the garbage collection metadata according to an exemplary aspect. As described above, the garbage collection requires physical to virtual address translation and chunk registry. Thus, according to an exemplary aspect, the exemplary system and method will utilize three log-structure merge (LSM) trees with a commit log to ensure atomicity to data updates. Thus, as shown, a first tree maps virtual extents of the logical file to data log extents of the append-only data log, a second tree performs the reverse mapping, and a third tree contains usage information on every data chunk in the data stream that still in use (i.e., each data chunk that still contains useful data that is mapped to the logical file).

Moreover, in one exemplary aspect, the data cleaning module (i.e., the "garbage collector") is configured to determine the timing for when to perform the garbage collection. For example, the data cleaning module can be configured to determine and monitor how many bytes are being used in a particular chunk of the data stream 102 (203) as described above. For example, the size of the actual data in each chunk can be stored in a data structure, which can be, for example, a list, a table, or a separate tree having exactly the same LSM structure as the trees that store the address mapping 105 in the file as described herein, etc. This separate tree can be updated, for example, after each transaction by updating the respective log entry, after which it becomes part of the LSM tree. Accordingly, the data cleaning module can refer to this separate tree to determine and monitor how many bytes are being used in a particular data chunk on the data stream 102 (203), for example.

When the data cleaning module detects that this value is lower than a set threshold (e.g., the predetermined threshold can be 75%, 50%, also it can be set to any value by user or by design of the storage; or it can be computed or adjusted automatically depending on the load or the amount of free space on underlying physical disks) as described above, the data cleaning module moves the data still being used (i.e., the "useful data") to the end of the append-only data log (as a new extent, for example), updates the mapping structure 105 and releases the old chunk according to the exemplary aspect. It should be appreciated that this process is not visible to a user and that the data cleaning module may use metadata (i.e., the mapping structure 105, or other special metadata structures), to understand which chunks should be deleted.

According to another exemplary aspect, this "data cleaning" of the data stream can be performed, for example, periodically and activated by a timer. In an alternative aspect, the data cleaning can be performed when the physical disk 202 (or plurality of physical disks) has less free space than M % of the disk size, or when new "useful" data (e.g., new data 201) is added to the data stream. Moreover, it should be appreciated that the data cleaning operation can be more or less aggressive. Data cleaning of the data stream can stop on different conditions, for example, the data storage module 12 can trim the whole disk, or analyze and rewrite just several chunks, or it may stop when free space on the disk becomes more then L %, for example. Moreover, the data cleaning module can be implemented as part of the data storage module 12 or can be an independent system, for example.

According to an exemplary aspect, when the data size in infinite data stream (e.g., the infinite data stream 203) becomes close to or bigger than the size of the underlying finite physical disk 201, the data storage module 12 is configured to perform the data cleaning to free some space and provide ability to write data to freed space in (e.g., the start of) the block device. In case when data cleaning procedure works like "trimming", then freed space can be at the start of block device and so new data can be written to the start of the block device, and this process can be continued until data is written to the end of block device. In an exemplary aspect, segments (i.e. rather big parts) of infinite data stream are mapped to segments of the block device, for example, by determining the remainder of division by size. It should be appreciated that if the data stream has several underlying physical devices (e.g., multiple physical disks, or multiple block devices), then the algorithm can be more complicated. For example, the algorithm may add a new physical disk (e.g., a block device for a new data chunk), when there is too little free space on the existing devices. This process involves determining the remainder of division by size (i.e., now the sum of sizes of each block device) to perform cycling (looping). Thus, segments (e.g., data chunks) of the data stream are mapped to real segments by getting remainder of division by size so the data is cycled.

According to an exemplary aspect, the data storage module can manage the size of the data stream according to the following process. First, when the data storage module 12 writes data (e.g., new data 201) to the data stream (e.g., infinite data stream 203), the data storage module 12 determines whether this new data 201 is intended to overwrite any other data (e.g., data block 206) in the data stream. That is, the data storage module 112 can check if this new data 201 corresponds to (i.e., whether it was intended by the user to be placed into) any existing chunk (a part/piece/block/extent of data in data stream) in the virtual file. If not, the data storage module writes the new data 201 to the end of the data in data stream as described above. However, if the new data 201 is determined to replace at least a portion of an existing chunk, the data storage module 12 can perform one of two processes. First, if there is a small amount of data (e.g., if the new data 201 to rewrite existing data is determined to be less than N % of the data chunk), then the data storage module 12 simply writes this new data file 201 to the end of the data stream. It is noted that the N % can be predetermined and set by a system designer, for example, or set by user, or it can be computed depending on the load, the number of write requests, or on the amount of free space on the underlying device. Alternatively, if the amount of new data 201 is large (e.g., if the new data 201 to rewrite existing data is determined to be more than N % of the chunk), then the data storage module 12 identifies the corresponding chunk that contains data that should be rewritten by this new data 201 (e.g., identifies data chunk 206), copies data (i.e., the portion of the data that will still be actual data after rewrite) from the identified chunk, and place that copied data and the new data 201 to the end of the data stream. In other words, a new chunk is created and added to the data stream that includes the actual data from the existing chunk plus the new data 201 so that the whole "corresponding" chunk is effectively rewritten to the end of the data stream. According to one exemplary aspect, the corresponding (old) chunk (e.g., data chunk 206) can be marked as no longer at use. Thus, when the data cleaning operation is executed, the data cleaning module will discard the old chunk marked as "rewritten" or "unused", for example.

As described above, the mapping structure 105 is implemented in the exemplary system that contains mappings between the pieces of data (i.e., the offsets data) written to the virtual file 103 and the corresponding offsets in data stream 102 (203). In a refinement of the exemplary aspect, the mapping structure 105 can have a complex structure, for example, a log-structure merge (LSM) tree scheme or the like.

FIG. 6 illustrates an example of an LSM tree implemented for the mapping structure 105 according to an exemplary aspect. Moreover, as noted above, the mapping structure 105 can be stored as metadata in a metadata server 30 according to one exemplary aspect, and on the client according to another. As shown in FIG. 6, a log (i.e., journal 306) is provided to receive update to the mapping. That is, when a user writes/updates data in a file (e.g., virtual file 103), the data stream 102 (203) is also updated as described above, and the metadata relating to the mapping of the offsets of this data is inserted into mapping structure: first, in case of LSM tree—in journal 306 (i.e., commit log). Next, when the journal 306 is full, journal 306 can be deleted and data metadata from them can be inserted into a low-level B-tree (e.g., B-tree 305). When this low-level B-tree 305 reaches its threshold size, it is merged with a top-level B-tree (e.g., B-tree 304). Thus, for example, entries in B-tree 305 will be merged into B-tree 304, entries in B-tree 304 will be merged into B-tree 303, and so forth, until reaching the top-level tree 302.

According to the exemplary aspect, it should be appreciated that the multilevel structure with the underlying n,k encoding algorithm helps making insertions into a file and allows rewriting the data. As a result, there are no random writes and the data can be written sequentially and fast. Thus, using the LSM tree as shown in FIG. 6, for example, can improve the performance of read and write operations by the client device 10, for example. In the exemplary aspect, each of the B-trees (e.g., trees 302 to 305) of the LSM tree structure 300 is a hierarchically organized index, i.e. an array of key-value pairs that can be stored in fixed-size blocks. Thus, when the client device 10 is requesting to perform a read operation, for example, data module 112 can search for a key by looking in the B-trees of the LSM tree 300, from the smallest one (which is the bottom tier 305 of the LSM Tree 300) until the biggest B tree 302, for example. It should be appreciated that the smallest tree 305 is the B-tree that is changed the most frequently.

According to the exemplary aspect, the smallest tree 305 is generally not stored on a physical disk, but only in memory (e.g., a write buffer) of the client device 10, for example. The data of the larger B-trees that are higher in the hierarchy of LSM tree 300 is stored on the physical disks (e.g., disks 32A, 32B, and/or 32C) of the metadata server 30 or on at least one disk of client device, for example. As further described above, the metadata contained in the smallest B-tree is duplicated in the journal 306. When the size of the data in the journal 306 is becomes larger than a predetermined threshold (e.g., set by a system administrator), the metadata records from in the journal 306 are inserted into this smallest B-tree, which can then be merged with the next B-tree as described above. It should be appreciated that the merging can be performed by the metadata server 30 or storage module 112, for example, and is performed by effectively deleting both trees and writing a new tree that contains all information from initial B-trees. As a result, all metadata write operations are performed and tracked successively.

FIGS. 7A to 7E illustrate a flow diagram of the update of the LSM tree implemented for the mapping structure 105 according to an exemplary aspect. First, referring to FIG. 7A, a commit log (e.g., journal 306) can be provided to receive recent updates as described above. Moreover, the LSM tree can be provided as a hierarchical set of B-trees (e.g., B-trees L0, L1, and L2) updated on log rotation, for example. In general, an LSM tree is a way to efficiently store metadata for displaying offsets in the date log and the virtual file. New elements of this mapping are written in a row to a commit log which can be represented by a file (in some aspects a commit log is a journal described above). Periodically, the commit log is cleared, and the metadata (e.g. display table) is saved as a B-tree (multi-level index tree). In one exemplary aspect, in order not to overwrite the entire display table every time, the LSM tree is divided into several "levels" that are differing in size.

Figure 7B:
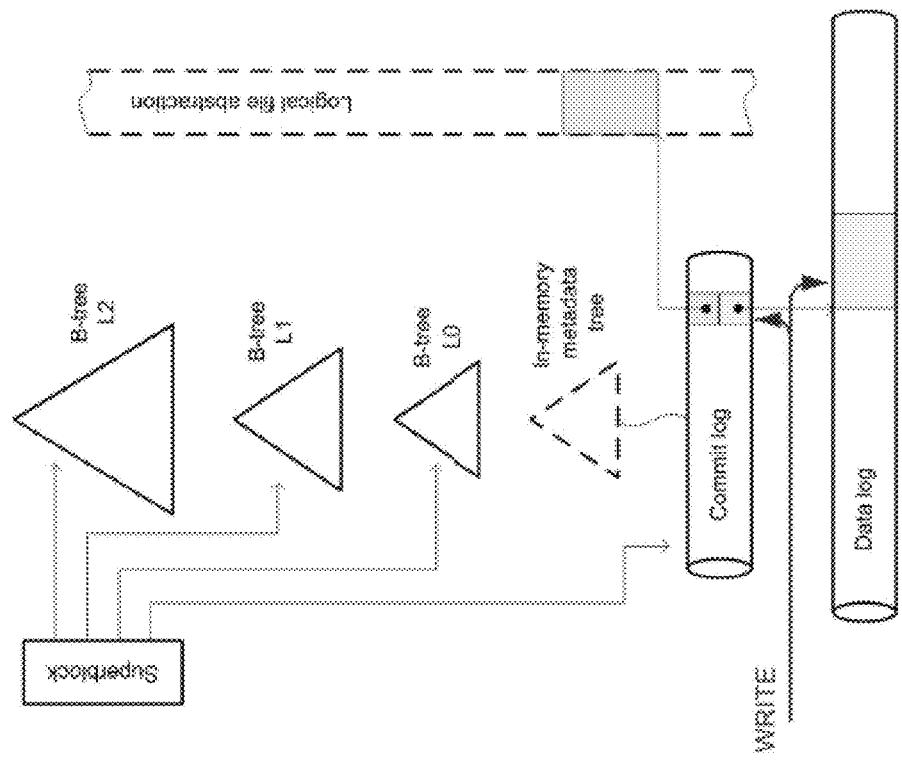
FIGS. 7A to 7E illustrates a flow diagram of the updated of the LSM tree implemented for the mapping structure according to an exemplary aspect.
Figure 7A:
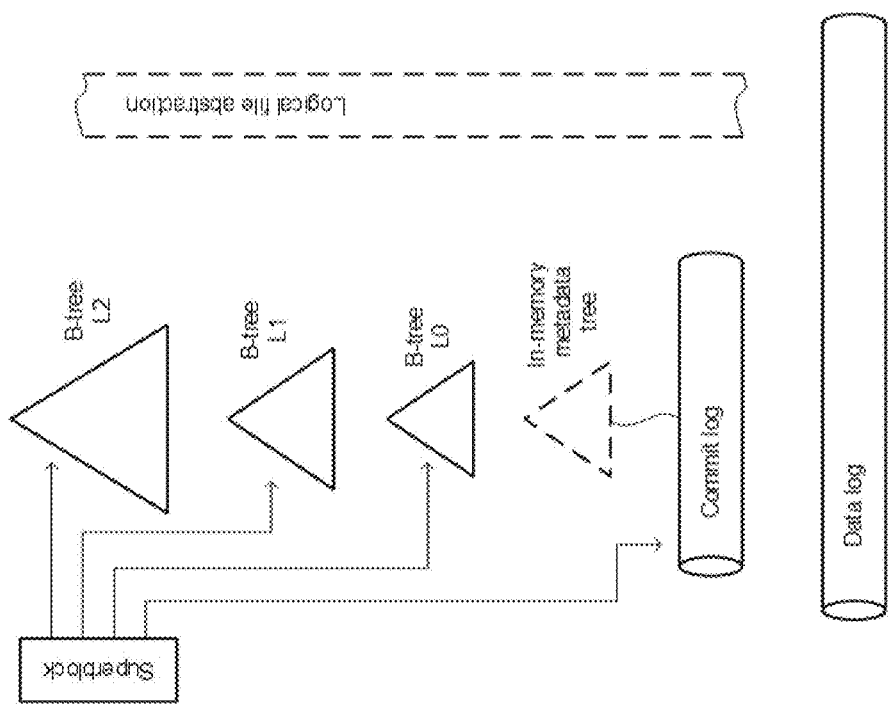
Figure 7D:
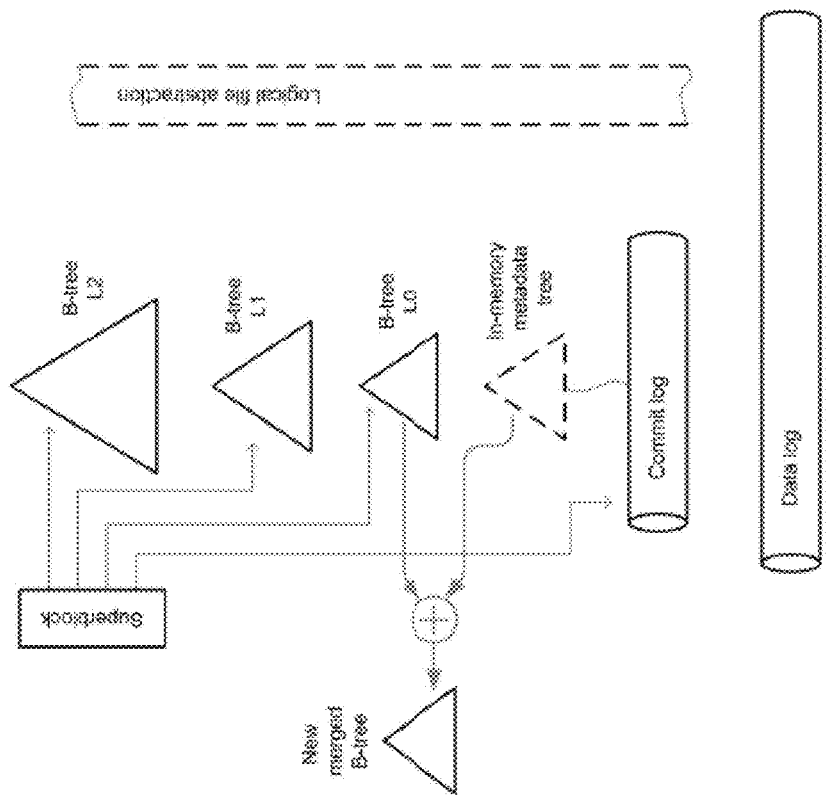
Figure 7C:
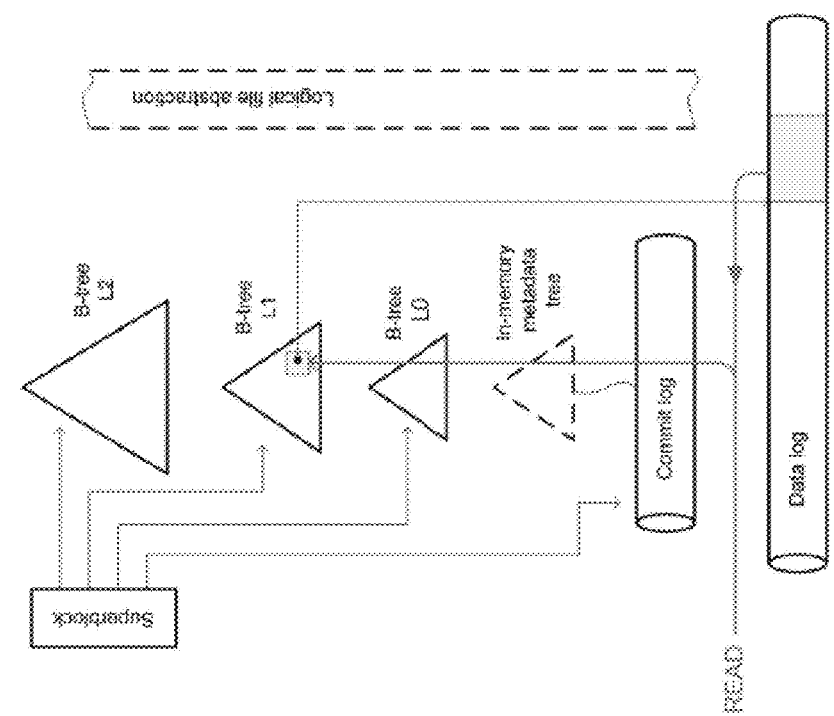
Figure 7E:
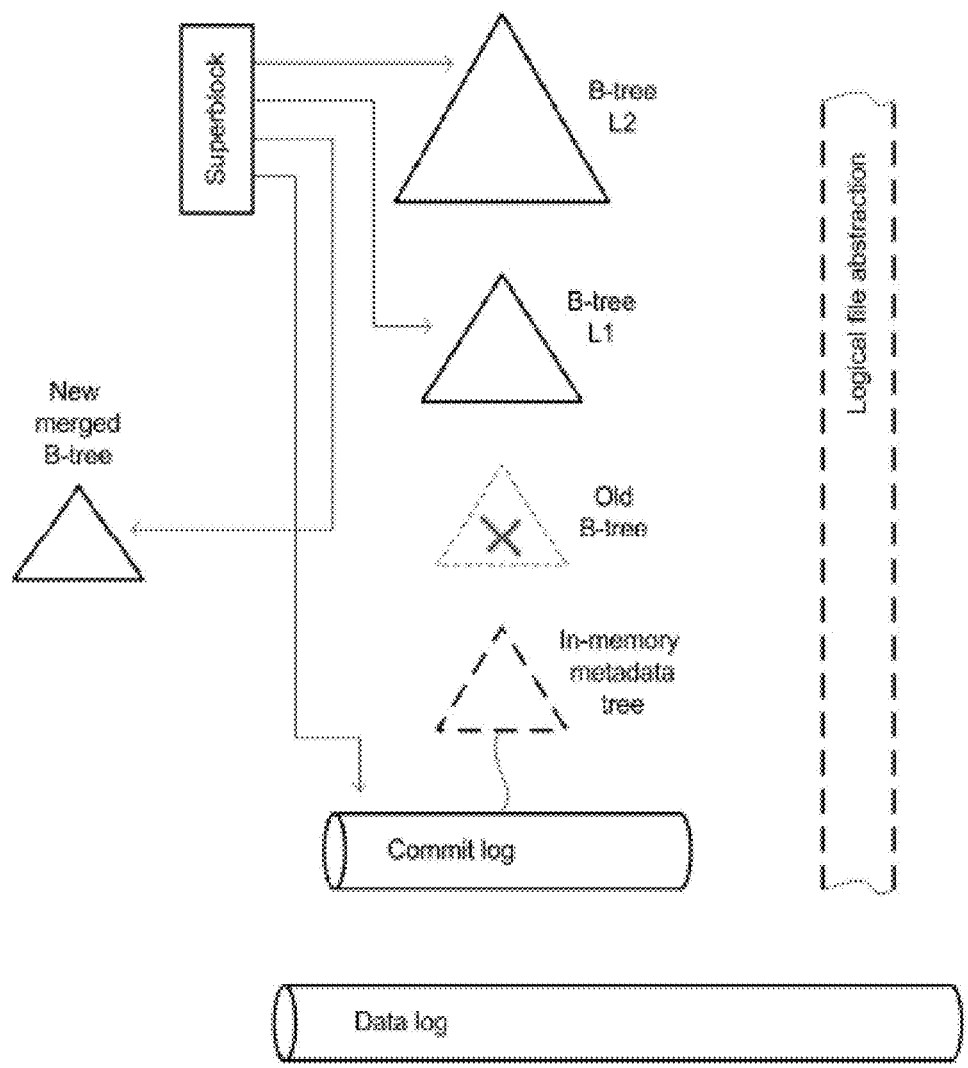

As further shown in FIG. 7B, during write operations data is appended to the data stream (which can also be called data log) as extents, the offset translation between the virtual file and data stream (data log) is recorded in the commit log (journal). As shown in FIG. 7C, in order to process data read operations, the offset translation metadata can be looked up in the tree hierarchy (e.g., read from B-tree L1). Based on this identified offset translation metadata, the corresponding data can be read from the data log. FIG. 7D further illustrates the merging of the offset translation metadata according to an exemplary aspect. More particularly, according to one exemplary aspect, the metadata trees are merged with lower levels periodically while the larger trees are merged less frequently to amortize merge costs. Thus, as shown, the translation offset metadata temporarily stored in the commit log (i.e., the "in-memory metadata tree") can be merged with the metadata in B-tree L0, for example, to create a new merged B-tree. As further shown in FIG. 7E, the metadata tree can be replaced. That is, after the new merged tree is created, it replaces the old B-tree. According to the exemplary aspect, metadata tree replacement should be atomic since it requires only updating the reference in super-block.

In one aspect, when an LSM scheme is used for the mapping structure 105 as described above, the data storage module 12 can use two additional LSM trees to update the actual data. Specifically, a first LSM tree (similar structure as described above) can be provided for reverse translation from offsets in the data stream 102 (203) to offsets in the virtual file 103. Moreover, a second LSM tree (also similar structure as described above) can be provided as a chunk tree used to understand which chunks should be deleted (i.e., keys are chunks, values are numbers of used bytes in the corresponding chunk). Thus, when the data storage module 12, for example, is set to delete a chunk, it uses the reverse translation tree to find all fragments that are still used and copies them to the end of data stream as described above. Then the crunk tree can be used to identify the location and size of the crunks to be deleted and remove them accordingly. It should be appreciated that the reverse translation tree and chunk tree can be updated periodically or each time the client writes to the virtual file 103 as generally described herein.

Thus, as described above, in the exemplary aspect, the journal 306 can be a part of the mapping structure 105, in some aspects. However, in an alternative aspect, the journal 306 can be part of the infinite data stream (e.g., data stream 102 (203) described above). In this aspect, during a write operation, existing data is not overwritten. Instead, the changes are appended to the end of the journal 306. Infinite journaling allows the writes to be repeated if necessary. This feature can facilitate asynchronous replication because the write operations can be transmitted over slower links without losing storage consistency or waiting for a response from the remote side (e.g., the physical disk) to indicate the write completion. While in an erasure coding scheme, the performance may be a bit slower using this implementation, greater storage efficiency without the loss of redundancy makes this implementation advantageous for storing data where top level performance is less of a concern.

Figure 8:
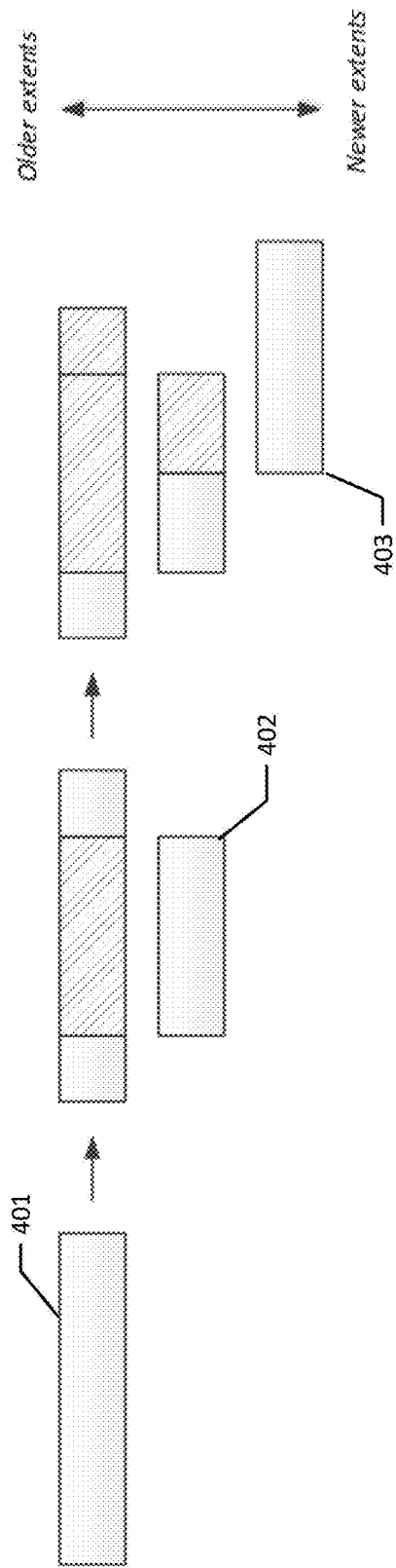
FIG. 8 illustrates a flow chart of ranges overlapping while data changing according to an exemplary aspect.

FIG. 8 illustrates a flow chart of ranges overlapping while data changing according to an exemplary aspect. As described above, data is written to the virtual file 103 by fragments of arbitrary size. According to this disclosure, the ranges of offsets in the virtual file can be referred to as "extents" and act as keys in trees of the LSM tree 300, for example (or any other data structure used for the same purpose). Thus, a first range or extent 401 is illustrated in FIG. 8. When a client (e.g., user or any application on client device 10) changes data in a virtual file (e.g., virtual file 103), new data is added to the end of the data in data stream 102 (203), for example, and the mapping of offsets is changed as described above. As a result, the new key-value pair is added to the lowest level tree (e.g., low-level B-tree 305) in the exemplary aspect. However, adding new extents to the lowest level tree 305 can result in the system has two overlapping extents (i.e., overlapping ranges of offsets). In this situation, the cleaning module (e.g. garbage collector), which can be, for example, a part of data storage module 12 is configured to (e.g., in some time) delete the part of older extent (i.e., a portion of a range) that was overlapped by the newer extent (e.g., new extent 402 and then new extent 403). In other words, the old extent 401 can become unused as a whole or split into two parts or just become smaller. It is noted that the overlapped (i.e., old ranges) of the extent are show as hatched portions of the extents in FIG. 8.

According to the exemplary aspect, such operations are preferably performed only for the lowest level tree (e.g., low-level B-tree 305), because this tree is in memory, as noted above, while all other trees are stored on disk. (In some aspects, high level trees are never changed, for example, during merge of 2 trees, they both are deleted and a new one, containing information from both of them, is created). It should be appreciated that when trees are merged, such operations are performed for them too. Moreover, such rules are also used while searching in LSM trees. In such trees, the values are ranges of offsets in the data stream, so values in such trees have fixed-size.

Figure 9:
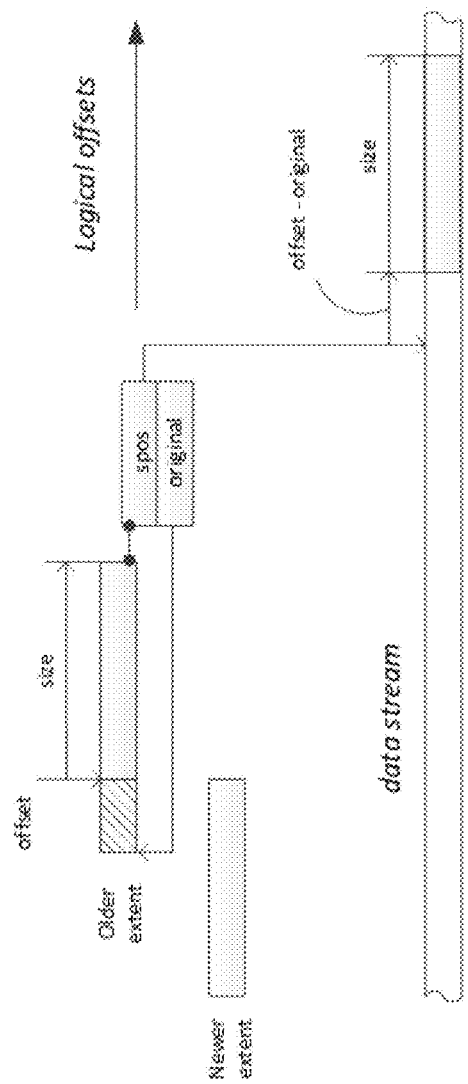
FIG. 9 is a flow chart illustrating that overlapping of extents do not influence real data according to the exemplary aspect of FIG. 8.

FIG. 9 is a flow chart illustrating that overlapping of extents do not influence real data according to the exemplary aspect of FIG. 8. As noted above, extents correspond to ranges of offsets in a file that can overlap. When there is an overlap in ranges, the overlapped range is either absorbed by another newer range, cut off, or split into two. According to the exemplary aspect, the metadata is tied to the ranges is not changed. In other words, to ensure that the ranges do not lose validity, the offset in the virtual file 103 corresponding to the original range is stored. Therefore, for all modifications of the ranges, the metadata retains the correct binding to the offsets in the virtual file. According to this aspect, real data is not influenced because values are formatted that will not be influenced by transformation of the corresponding extent. In particular, FIG. 9 is a diagram showing an example of the information that can be stored in elements of the address mapping tree. Metadata contains data stream offset, and virtual file offset (denoted "logical" offset on FIG. 9), corresponding to the beginning of initial extent.

Figure 10A:
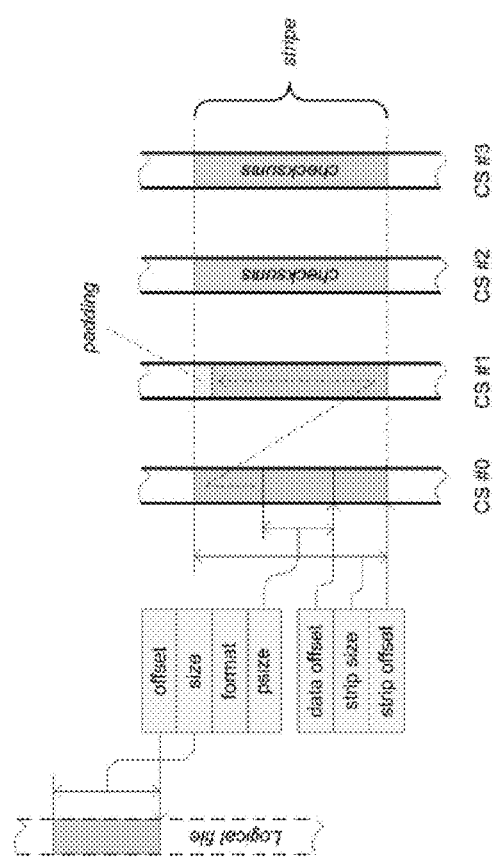
FIG. 10A illustrates an example of the metadata structure for the offset translation according to an exemplary aspect.

FIG. 10A illustrates an example of the format of a metadata records for the offset translation according to an exemplary aspect. As described above, such metadata describes, for example, locations of corresponding data extent in virtual file and in underlying physical resources. Thus, as shown, metadata for the data extent in the logical file can be generated so that it includes the offset, size, format and physical size as further shown. Moreover, in this example, data strips are written to chunk servers CS#0 and CS#1 whereas checksum strips are written to chunk servers CS#2 and CS#3.

Referring back to FIG. 1, in one exemplary aspect the data storage module 12 is configured to store data from the data stream 102 (203) to a plurality of physical disks (e.g., block devices), such as chunk server 20, for example. In one aspect, the data storage module 12 can store the data using data caching in which the data is written to physical disk(s) as groups of encoded data units, called stripes. In this aspect, the write operations to the physical disks are generally not immediate and direct, but rather a write buffer (e.g., cache memory of the client device 10) is provided to store at least one stripe. Accordingly, each stripe from the data stream 102 (203) is temporarily stored by the data storage module 12 in the write buffer. The data storage module 12 can monitor the capacity of the write buffer, and when the buffer is full, the data storage module 12 can write a strip of the encoded data to physical disk(s) (as encoded data blocks, in some aspects). In this aspect, each strip has an equal size. Once this step is performed, the data storage module 12 can also update the metadata to indicate the locations of the encoded data stored in the physical disks.

Figure 10B:
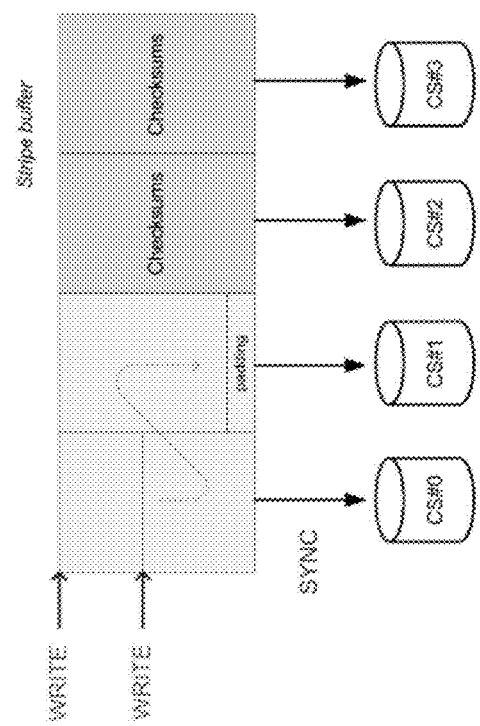
FIG. 10B illustrates a block diagram showing the data buffering according to an exemplary aspect.

FIG. 10B illustrates a block diagram showing the data buffering according to an exemplary aspect. As described above, the data log is written directly to several disks by stripe. Stripes are pre-assembled in the write buffer, that is, in memory. A new stripe is written when the client sends a query to the SYNC of the recorded data. Thus, in the exemplary aspect, as shown, the data and checksums are first written to the write buffer (i.e., the "stripe buffer"). As such, the whole strip is assembled in the stripe buffer and either written on a SYNC command or when a full stripe with maximum size is read to be written. Similar to the example described above, the data strips are written to chunk servers CS#0 and CS#1 whereas checksum strips are written to chunk servers CS#2 and CS#3.

In one aspect, a user of the client device 10 and/or the data storage module 12 directly can call a flush function that forcibly flushes the data from the data buffer to the physical disk. As a result, the data in the buffer is written to the disk(s) even if the write buffer is not full and then the metadata is updated accordingly. The flush function effectively helps prevent the loss of data stored in the data buffer (e.g., the cache memory) in case of a power failure of the client device 10, for example. In another aspect, the write buffer can also be used to move data from the data file (e.g., file 103) to the data stream (e.g., data stream 102 (203)) using the same methods described above.

According to one exemplary aspect, a user (for example, some data bases behave in such way) may sometimes write small piece of data (e.g., 4 Kb) to the data file and then calls an "fsync" operation, for example, that forcibly flushes the data to the disk as described above. However, each sync may involve many operations and, therefore, require approximately 10 milliseconds (e.g., in the case of HDD disk). As a result, such a system cannot perform more than 100 sync operations per second. Using a journal, such as journal 306, helps overcome this technical limitation.

According to an exemplary aspect, the journal 306 records metadata: for example, the correspondence between offsets in the virtual file 103 and offsets in the data stream 102 (203) (i.e., physical and logical addresses) according to an exemplary aspect. However, according to a refinement of this aspect, the data storage module 12 can also write small pieces of data (e.g., 4 Kb) to the journal 306. Thus, data journaling implies using a log file with mappings between offsets in the virtual file 103 and offsets in the data stream 102 (203). When the a user (e.g., an application, any program, or user of a device) writes a small piece of data to the virtual file 306, this data can be added to the journal 306 along with its offsets in the data stream 102 (203) and virtual file 103 according to this exemplary aspect. At this same time, data is concurrently filling the write buffer and will be written to a physical disk(s) when it is full as described above. Therefore, in this aspect, if the user requests a sync for the small piece of data, the data storage module 12 does not immediately perform the required sync (e.g., usually including syncs for mapping table, data stream, etc.) in response to this sync request, but rather places the data in the journal 306 (and performs sync only for the journal) and return success to the user. As a result, the data can be written sequentially and fast and is not limited to the number of syncs (e.g., by 100 sync operations per second, as it was without journal) when performing flush operations of the write buffer. Moreover, in one aspect, the journal 306 can be replicated.

Figure 10D:
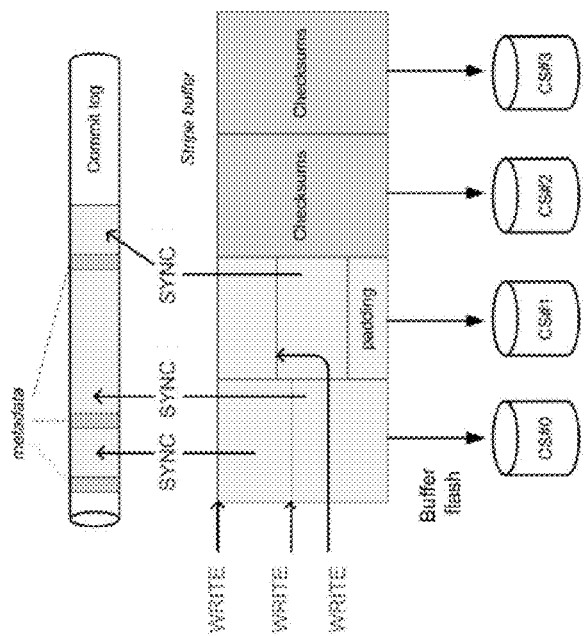
FIGS. 10C and 10D are block diagrams illustrating issues surrounding small write operations and the journaling solution for addressing these issues according to an exemplary aspect.
Figure 10C:
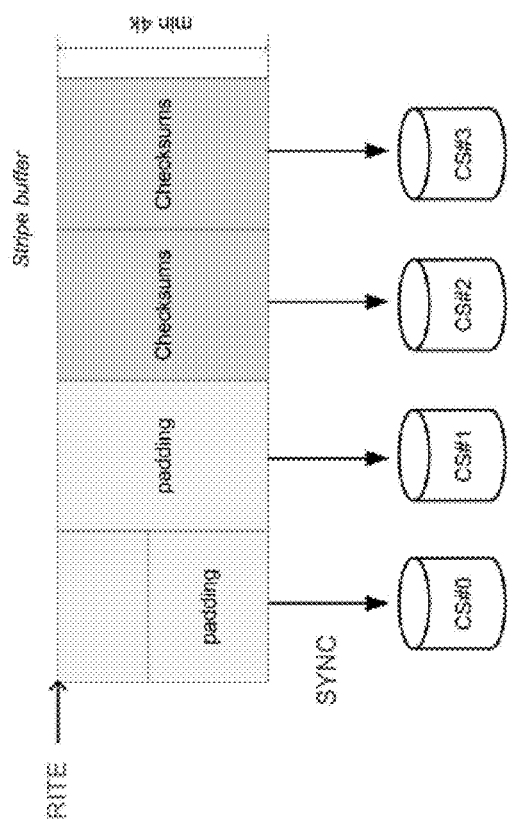

FIGS. 10C and 10D are block diagrams illustrating issues surrounding small write operations and the journaling solution for addressing these issues. In general, as shown in FIG. 10C, to effectively organize the writing/reading of a disc, the writing should be in multiples of the page size (4k). However, as described above, if the client writes small pieces and makes SYNC after each record, the would typically have to write 4k bytes multiplied by the number of disks even if the client wrote only one byte. Thus, it should be appreciated that the small write/SYNC pattern would be handled very inefficiently in this example.

To avoid this, in some aspects, the system is configured to write the data in the commit log (i.e., journal 306) along with the metadata and the stripe is written only when sufficient data is accumulated. In other words, the journal 306 (i.e., a commit log) is provided to address small write operations, such that the data is written to the commit log on every SYNC following the metadata record as shown in FIG. 10D. As further described above with respect to FIG. 10B, the stripe buffer may be flushed once it is full. As a result, data is not continuously being added to the data stream every time a write operation is performed to the virtual file.

Moreover, according to an exemplary aspect, in case of failure, the data will be stored only in the journal 306 and generally not be written to disk. Therefore, on the next startup, the user server/process will need to check for the data in the log file, which can be written to the physical disk at that time.

As described above, the B-trees of the LSM tree are generally used to store the metadata. Therefore, when actual data is stored in the journal 306 according to the exemplary aspect, this data stored in the journal 306 should not be placed in the trees. Thus, according to the exemplary aspect, before performing the merge operation with the journal 306 and the trees (e.g., low-level B-tree 305), the data storage module 12 is configured to perform a sync operation to forcibly flush data from the journal 306 to the disk (or to data stream). In other words, once the data storage module 12 determines the journal 306 is to be merged with B-tree 305, as described above, it will first perform the sync operation according to the exemplary aspect.

By performing the optimization described above, the exemplary system can substantially reduce the processing requirements of the computing device(s) performing the distributed storage of the data file on the physical disk as performance of the system is quite near the performance of the system without erasure coding. In particular, without this optimization, the disk load (i.e., the number of sync operations) is N+K+n, where N is number of disks in the system, K is redundancy (e.g., for RAID6 K=2), and n is number of journal replicas. With this optimization scheme, only n sync operations are required so the performance improvement is equal to (N+K+n)/n. For example, if there are 10 physical disks (i.e., N=10), and the system is using RAID6 (i.e., k=2=# of parity blocks), and there are 3 journal replicas, then the system will require 15 sync operations. Using the exemplary optimization described above, only 5 sync operations would be required (i.e., 10+2+3)/3=5).

Figure 11:
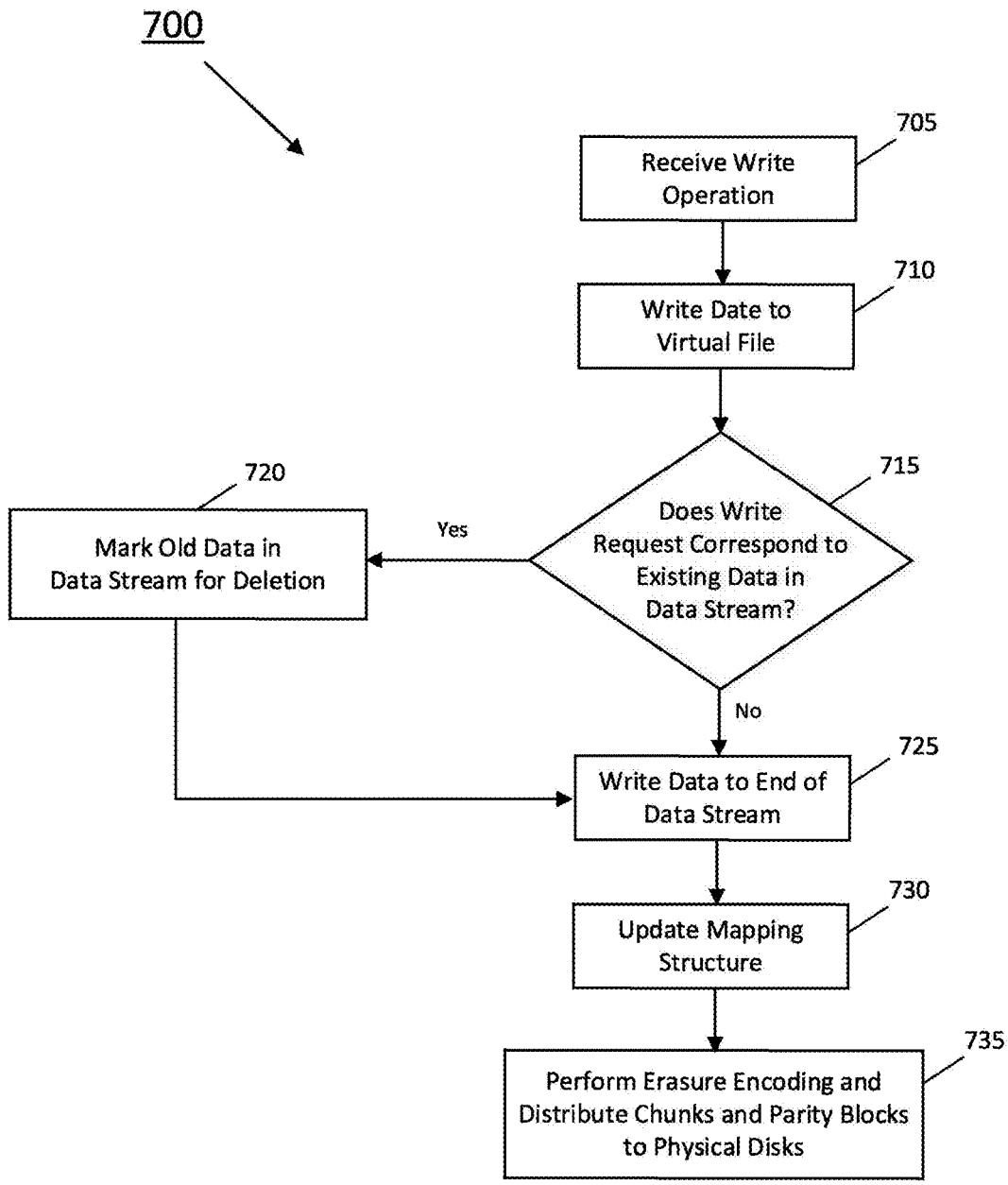
FIG. 11 is a flowchart for a method for fast random access erasure encoded storage according to an exemplary aspect.

FIG. 11 is a flowchart for a method 700 for fast random access erasure encoded storage according to an exemplary aspect. It should be noted that the method shown can be implement using client device 10 and data storage module 12, as described above, according to an exemplary aspect.

Thus, as shown, initially at step 705, the client device 10 receives a user operation to before a write operation of a computer file. Next at step 710, this new data is written to the virtual file, for example, the write operation 104 to virtual file 103 as shown in FIG. 3.

At this point, the data storage module 12 determines at step 715 whether the write request corresponds to existing data in a data stream (i.e., whether existing data is to be rewritten). If so, the existing data chunk in the data stream 102 (203) can be marked for deletion during the data cleaning operation discussed below. As shown in the flowchart, after both steps 715 and 720, the method proceeds to step 725 where the new data is written to the end of the data stream 102 (203). The mapping structure (e.g., mapping structure 105) is updated at step 730 to map the offset of the new data in the virtual file 103 and the appended data in the data blob of data stream 102 (203). Moreover, the data storage module 12 can also update the metadata indicating that the old data has been marked for deletion. Finally, at step 735, the data storage module 12 can perform erasure coding of the data in the data stream 102 (203) by dividing the data into a plurality of equal data chunks, creating parity blocks, and equally distributing the data chunks and parity blocks across a storage cluster, such as a plurality of physical disks of a plurality of chunk servers. Moreover, in one aspect, metadata mapping the data in the data stream 102 (203) to the physical disks (e.g., chunk servers 101) can be distributed to one or a plurality of metadata servers (e.g., metadata server 30) according to an exemplary aspect, though in another aspect, it can be stored on client device.

Figure 12:
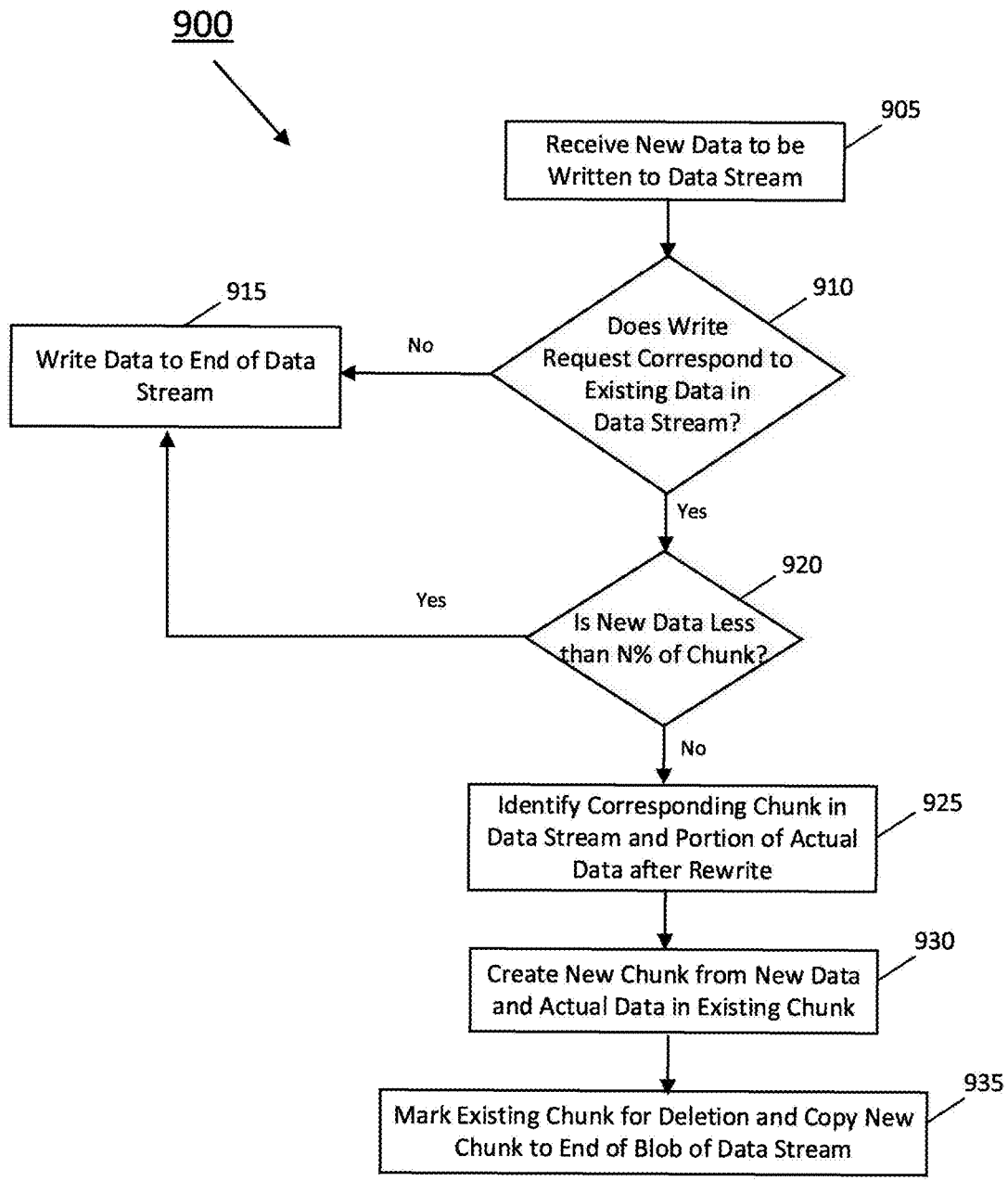
FIG. 12 is a flowchart for a method for fast random access erasure encoded storage according to a refinement of the exemplary aspect shown in FIG. 11.

FIG. 12 is a flowchart 900 for a method for fast random access erasure encoded storage according to a refinement of the exemplary aspect shown in FIG. 11. In particular method 900 is a refinement of certain aspects of method 700 described above. In this exemplary aspect, the new data (as part of a write request) is added to a virtual file 103 and obtained by the data storage module 12 at step 905. In a similar manner as described above, the data storage module 12 determines at step 910 whether the data in the write request corresponds to existing data in the data stream. For example, referring back to FIG. 5, the data storage module determines whether the new data 201 is data to rewrite/overwrite data in an existing data chunk (or part thereof) in the data stream (i.e., the infinite data stream 203). If not, the method proceeds directly to step 915 where the data storage module writes the new data to the end of the data stream 102 (203) (e.g., the infinite data stream 203).

Alternatively, if it is determined at step 910 that the new data corresponds to existing data in the data stream 102 (203), the data storage module 12 then determines at step 920 whether the new data (in the write request) is less than a predetermined threshold or percentage of the corresponding data chunk. If so, the data storage module 12 simply returns to step 915 and writes the data to the end of the data stream 102 (203). Otherwise, if the new data is not less than this threshold (i.e., it is greater than the threshold or N %), the method proceeds to step 925 where the data storage module 12 identifies the correspond data chunk in the data stream 102 (203) and further determines the portion of the actual data that is still being used by the file, which can be done referring to the mapping structure, for example. In other words, the data storage module 12 identifies the useful data (i.e., the used extents) existing in the identified chunk of the data stream 102 (203). At this point, the data storage module 12 creates a new data chunk at step 930 that includes the new data of the write request and also the use data identified in the existing data chunk of the data stream 102 (203). Finally, at step 935, the existing data chunk in the data stream is marked for deletion and the newly created data chunk is appended to the end of the blob as a new block (or portion of a new block) of the data stream 102 (i.e., the infinite data stream 203).

Figure 13:
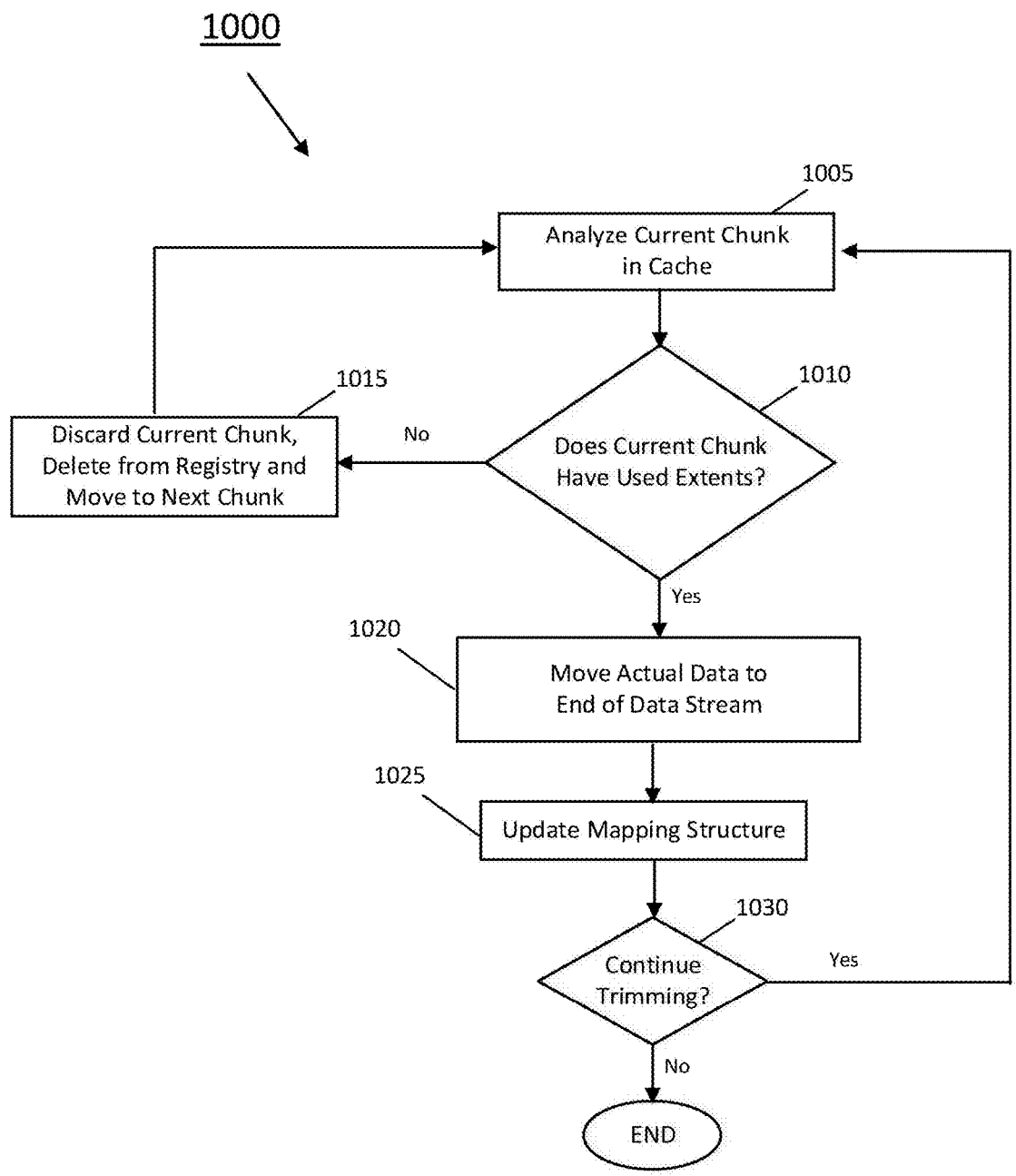
FIG. 13 is a flowchart for a method for trimming the physical size of the data stream according to an exemplary aspect.

FIG. 13 is a flowchart for a method 1000 for reducing (e.g. trimming) the physical size of the data stream according to an exemplary aspect. As described above, the data cleaning function can be performed by a data cleaning module, which can be, for example, a sub-module of the data storage module 12. Moreover, the data cleaning operation can be performed periodically and activated by a timer, or when the physical disk 202 (or disks) has less free space than M % of the disk size, or when new data (e.g., new data 201) is added to the data stream, or upon user request, as possible examples.

As shown, initially at step 1005, a current chunk (or block of data, e.g., chunks can have equal size) is analyzed to determine whether the current chunk has an actual data (i.e., extents currently mapped to the virtual file 103), for example. In some aspects, this current chunk can be selected based on a trigger that indicates that the data in the current chunk that is still in use has fallen below a predetermined threshold (e.g., 75%), which can be set by a system designer, for example, or by user, or can be computed dynamically depending on the load and disk size. In another aspect, it can be the first data chunk in the data stream, i.e. chunks in data stream can be evaluated successively. In another aspect, there can be a list of chunks that need evaluation, so one chunk is processed, next chunk from the list will be evaluated. Once selected for evaluation, the determination of whether the current chunk has used extents can be performed by analyzing the mapping structure 105 to determine whether any data extents in the virtual file 103 is mapped to the current data chunk being analyzed. If the chunk does not have actual data as determined at step 1010, then the method proceeds to step 1015 where the current chunk is released and the method moves to the next chunk.

Otherwise, if the current chunk contains used extents as determined at step 1010, the method proceeds to step 1020 where the actual data from the chunk is appended to the end of the append-only data log as described above. It is noted that in an exemplary aspect, the "useful data" (i.e., the actual data that is mapped to the virtual file) is only appended to the append-only data log if the amount of data in the chunk falls below a predetermined threshold as explained above with respect to step 920 of FIG. 12.

Moreover, the mapping structure 105 that maps the extents of the virtual file 103 is updated at step 1025 before the method proceeds to step 1030 to determine whether trimming should continue. As described above, there are a number of design implementation indicating whether the data cleaning should continue. For example, data cleaning can be set to evaluate every data chunk of which the actual data in use falls below a set threshold. Thus, step 1030 will be continually answered "yes" until all such data chunks have been evaluated at step 1010. Moreover, it is noted that the data cleaning can be performed periodically and be set to be performed for a predetermined number of chunks of the data stream 102 (203) or cycled through the whole data stream according to alternative aspects. In some aspects, it is noted that by using the data cleaning operation, the infinite data stream 102 (i.e., the infinite data stream 203) can be cycled like a ring buffer, as would be appreciated to one skilled in the art.

Thus, based on the exemplary systems and methods described herein, fast random access erasure encoded storage can be provided according to the exemplary aspects. Moreover, as further noted above, a primary technical advantage of erasure coding data protection is that, compared to replication, erasure encoding reduces the overall storage capacity needed protect the amount of data to help reduce data storage costs.

Thus, as described herein, multiple copies of data are distributed across multiple nodes in a storage cluster, and the data is highly protected and available. If a storage node or drive fails, the data will still be available to the application via the second, third, fourth copies, etc. Moreover, the system provides flexibility in that users have the capability to define how many replicas or copies of data they want to exist for a particular segment of data. This provides similar benefits as a RAID 1 mirroring implementation. However, in RAID solutions there is a tradeoff between redundancy/availability and cost and performance. For example, having two replicas within a storage cluster means that twice as much data storage capacity must be purchased and configured, and the capacity overhead is 100%. If a particular workload requires 500 TB of usable storage capacity, then 1,000 TB must be purchased and configured across the nodes in the storage cluster. Maintaining three replicas increases the capacity overhead by 200% and so on.

An erasure coding configuration can be described with the formula M+N[/X], where M is the number of data blocks (stripe-depth), N is the number of parity blocks, and X is the write-tolerance (i.e., how many storage nodes can be down provided that the client is still allowed to write a file). Using, for example, a 5+2 erasure coding design as an example, the capacity overhead amount in a storage cluster can be reduced to just 40% (i.e., 2 GB of parity data for every 5 GB of application data). That means that for the same workload that requires 100 TB of usable storage, only 140 TB of raw storage capacity must be allocated. This reduction in raw storage capacity can help a system lower costs and handle budget constraints, or allow enough storage capacity to be allocated within storage cluster environments where total storage capacity is limited by the number of storage nodes, drive slots, or drive capacity sizes, for example. Moreover, high availability is also maintained because in a 5 data elements +2 erasure code elements coding implementation, if any two elements are lost, the remaining elements can rebuild the data without the application experiencing an interruption or data loss.

Another advantage of software erasure coding provided by the exemplary systems and method is that while RAID unites disks into RAID volumes, the erasure coding described herein unites files. This design makes it possible to set various erasure coding schemas and replication for various files on top of one cluster (i.e., set of disks), balancing redundancy, and performance requirements applicable for that data. In a larger cluster, it is possible to decrease the overhead of the redundancy very significantly. For example, a 17+3 erasure coding design uses just 18% storage overhead. Moreover, users of the described system have the option of using replicas or erasure coding for data protection without reconfiguring their storage clusters.

Figure 14:
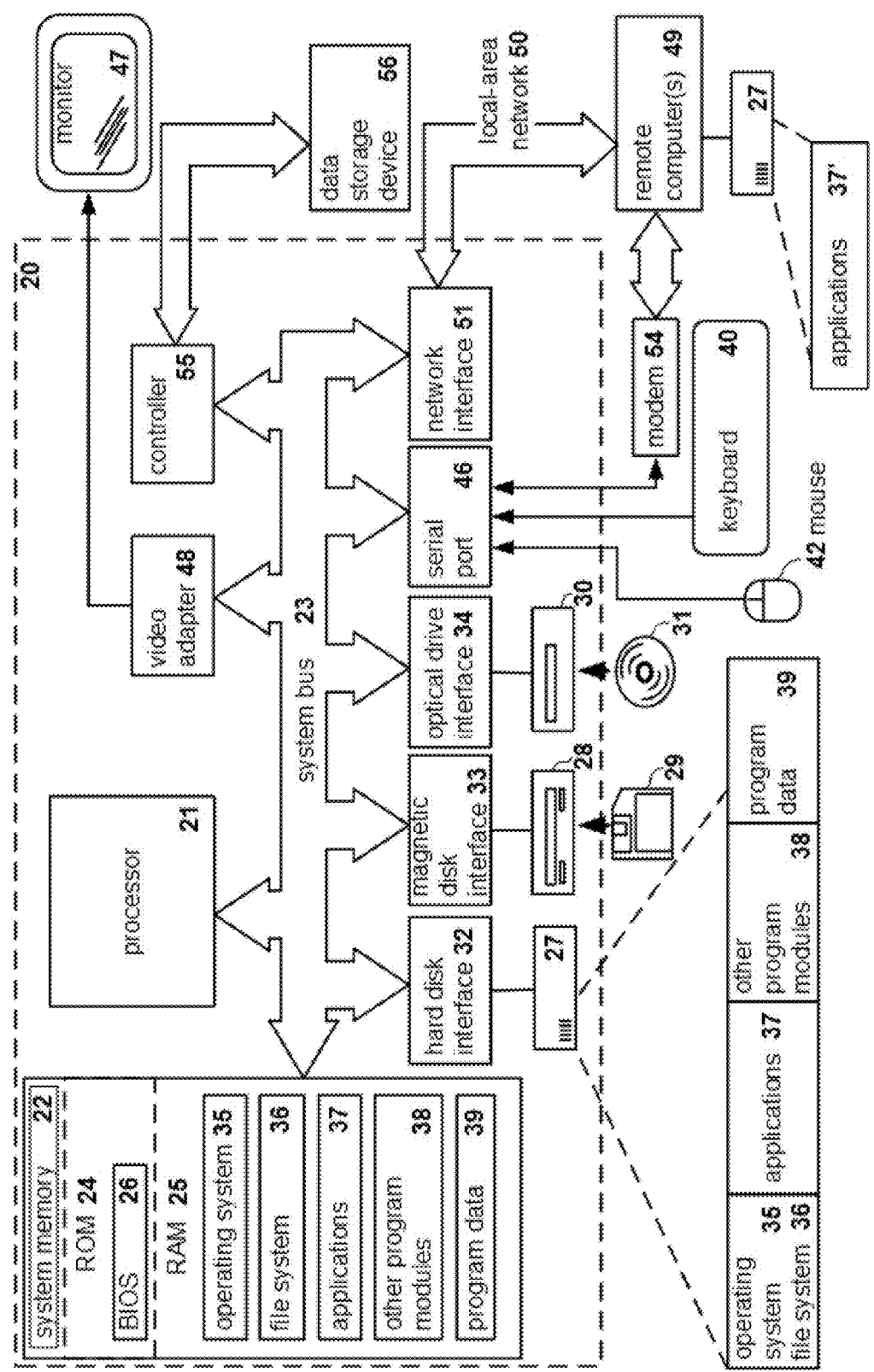
FIG. 14 is a block diagram illustrating a general-purpose computer system on which aspects of systems and methods may be implemented in accordance with an exemplary aspect.

FIG. 14 is a block diagram illustrating a general-purpose computer system 20 on which aspects of systems and methods may be implemented in accordance with an exemplary aspect. It should be noted that the computer system 20 can be used to implement the client device 10, chunk servers 20 and/or metadata servers 30 as described above.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for providing fast data storage using erasure encoding, the method comprising:
   writing data to an append-only data log that includes a plurality of data log extents each associated with data that is mapped to corresponding offset range of a virtual file of a client;
   storing the append-only data log as a sequence of data chunks each allocated on at least one storage disk, wherein storing the append-only data log further comprises:
      dividing the append-only data log into stripes having a configurable maximum size;
      dividing each stripe into a plurality of K data fragments;
      creating a plurality of M parity blocks for redundancy of the plurality of K data fragments; and
      distributing the plurality of K data fragments and the plurality of M parity blocks as strips to the at least one storage disk;
   determining an amount of useful data in at least one of the data chunks of the append-only data log, wherein the useful data comprises data that is currently mapped to an offset range of the virtual file;
   when the amount of useful data in the at least one data chunk is less than a predetermined threshold, appending the useful data from the at least one data chunk to an end of the append-only data log; and
   cleaning the append-only data log by releasing the at least one data chunk from the append-only data log after the useful data is appended to the end of the append-only data log.

2. The method according to claim 1, further comprising:
   providing a mapping structure that respectively maps a plurality of data extents of the virtual file with the plurality of data log extents of the append-only data log;
   updating the mapping structure after the useful data is appended to the end of the append-only data log to map the useful data to the corresponding offset range in the virtual file; and
   maintaining useful data length counters for at least a portion of the data chunks used for storing data extents of the client and updating the useful data length counters on every mapping structure update.

3. The method according to claim 2, wherein the mapping structure is a log-structure merge tree that contains a plurality of trees each having an array of key-value pairs, wherein a first tree maps the plurality of extents of the virtual file with the respective plurality of data log extents of the append-only data log, a second tree maintains a reverse mapping, and a third tree maintains the useful data length counters for at least a portion of the data chunks containing useful data that is used by the virtual file.

4. The method according to claim 3, further comprising:
   temporarily storing key-value pairs in a journal in electronic memory, wherein the stored key-value pairs map the respective data log extents of the append-only data log to the corresponding data extents of the virtual file;

merging content in the journal into a lower-level tree in the log-structure merge tree when the journal is full of key-value pairs; and merging the lower-level tree to a next level tree in the log-structure merge tree when the lower-level tree is full.

5. The method according to claim 4, further comprising: temporarily storing, in the journal, new useful data mapped to an offset range of the virtual file; and appending the new useful data to the end of the append-only data log before merging the journal content into a lowest-level tree in the log-structure merge tree.

6. The method according to claim 1, further comprising performing the cleaning of the append-only data log when the at least one storage disk has less free space than a predetermined threshold.

7. The method according to claim 1, further comprising: temporarily storing the data for a new data stripe in a write buffer; and distributing the new data stripe in the at least one storage disk when a length of the data stored in the write buffer exceeds a predetermined maximum stripe size or upon a flushing data instruction for the write buffer.

8. The method according to claim 1, further comprising: receiving, from a client, a write request to the virtual file; storing the data from the write request to a write buffer; writing the data stored in the write buffer to the append-only data log when a length of the data stored in the write buffer exceeds a predetermined maximum stripe size or upon a flushing data instruction for the write buffer;

writing corresponding updates to a mapping between data log extents and virtual file offset ranges to a journal; and merging the journal to a log structured merge tree when a length of the journal exceeds a predefined threshold.

9. A system for providing fast data storage using erasure encoding, the system comprising:
at least one storage disk; and
at least one processor configured to:
write data to an append-only data log that includes a plurality of data log extents each associated with data that is mapped to corresponding offset range of a virtual file of a client;
store the append-only data log as a sequence of data chunks each allocated on the at least one storage disk, wherein the at least one processor is configured to store the append-only data log by:
dividing the append-only data log into stripes having a configurable maximum size;
dividing each stripe into a plurality of K data fragments;
creating a plurality of M parity blocks for redundancy of the plurality of K data fragments; and
distributing the plurality of K data fragments and the plurality of M parity blocks as strips to the at least one storage disk;
determine an amount of useful data in at least one of the data chunks of the append-only data log, wherein the useful data comprises data that is currently mapped to an offset range of the virtual file;
when the amount of useful data in the at least one data chunk is less than a predetermined threshold, append the useful data from the at least one data chunk to an end of the append-only data log; and
clean the append-only data log by releasing the at least one data chunk from the append-only data log after the useful data is appended to the end of the append-only data log.

10. The system according to claim 9, further comprising:
a mapping structure that respectively maps a plurality of data extents of the virtual file with the plurality of data log extents of the append-only data log,
wherein the at least one processor is further configured to:
update the mapping structure after the useful data is appended to the end of the append-only data log to map the useful data to the corresponding offset range in the virtual file; and
maintain useful data length counters for at least a portion of the data chunks used for storing data extents of the client and updating the useful data length counters on every mapping structure update.

11. The system according to claim 10, wherein the mapping structure is a log-structure merge tree that contains a plurality of trees each having an array of key-value pairs, wherein a first tree maps the plurality of extents of the virtual file with the respective plurality of data log extents of the append-only data log, a second tree maintains a reverse mapping, and a third tree maintains the useful data length counters for at least a portion of the data chunks containing useful data that is used by the virtual file.

12. The system according to claim 11, wherein the at least one processor is further configured to:
temporarily store key-value pairs in a journal in electronic memory, wherein the stored key-value pairs map the respective data log extents of the append-only data log to the corresponding data extents of the virtual file;
merge content in the journal into a lower-level tree in the log-structure merge tree when the journal is full of key-value pairs; and
merge the lower-level tree to a next level tree in the log-structure merge tree when the lower-level tree is full.

13. The system according to claim 12, wherein the at least one processor is further configured to:
temporarily store, in the journal, new useful data mapped to an offset range of the virtual file; and
append the new useful data to the end of the append-only data log before merging the journal content into a lowest-level tree in the log-structure merge tree.

14. The system according to claim 9, wherein the at least one processor is further configured perform the cleaning of the append-only data log when the at least one storage disk has less free space than a predetermined threshold.

15. The system according to claim 9, wherein the at least one processor is further configured to:
temporarily store the data for a new data stripe in a write buffer; and
distribute the new data stripe in the at least one storage disk when a length of the data stored in the write buffer exceeds a predetermined maximum stripe size or upon a flushing data instruction for the write buffer.

16. The system according to claim 9, wherein the at least one processor is further configured to:
receive, from a client, a write request to the virtual file;
store the data from the write request to a write buffer;
write the data stored in the write buffer to the append-only data log when a length of the data stored in the write buffer exceeds a predetermined maximum stripe size or upon a flushing data instruction for the write buffer;

write corresponding updates to a mapping between data log extents and virtual file offset ranges to a journal; and merge the journal to a log structured merge tree when a length of the journal exceeds a predefined threshold.

* * * * *